United States Patent [19]
Stilp et al.

[11] Patent Number: 5,327,144
[45] Date of Patent: Jul. 5, 1994

[54] CELLULAR TELEPHONE LOCATION SYSTEM

[75] Inventors: Louise A. Stilp, Broomall, Pa.; Curtis A. Knight, Washington, D.C.; John C. Webber, Herndon, Va.

[73] Assignee: Associated RT, Inc., Pittsburgh, Pa.

[21] Appl. No.: 59,248

[22] Filed: May 7, 1993

[51] Int. Cl.$^5$ .................. G01S 1/24; G01S 3/02; H04M 11/00
[52] U.S. Cl. .................. 342/387; 342/457; 379/58
[58] Field of Search .................. 342/387, 457, 35; 379/58, 59, 60, 62; 364/449

[56] References Cited

U.S. PATENT DOCUMENTS

| | | | |
|---|---|---|---|
| 3,384,891 | 5/1968 | Anderson | 343/6.5 |
| 3,646,580 | 2/1972 | Fuller et al. | 342/457 |
| 3,680,121 | 7/1972 | Anderson et al. | 342/387 |
| 4,177,466 | 12/1979 | Reagan | 343/112 TC |
| 4,297,701 | 10/1981 | Henriques | 343/6.5 LC |
| 4,433,335 | 2/1984 | Wind | 343/463 |
| 4,596,988 | 6/1986 | Wanka | 343/457 |
| 4,638,321 | 1/1987 | Drogin | 342/444 |
| 4,639,733 | 1/1987 | King et al. | 342/424 |
| 4,651,156 | 3/1987 | Martinez | 342/457 |
| 4,651,157 | 3/1987 | Gray et al. | 342/457 |
| 4,728,959 | 3/1988 | Maloney et al. | 342/457 |
| 4,740,792 | 4/1988 | Sagey et al. | 342/457 |
| 4,742,357 | 5/1988 | Rackley | 342/463 |
| 4,791,572 | 12/1988 | Green, III et al. | 364/449 |
| 4,797,679 | 1/1989 | Cusdin et al. | 342/387 |
| 4,818,998 | 4/1989 | Apsell et al. | 342/44 |
| 4,870,422 | 9/1989 | Counselman, III | 342/357 |
| 4,888,593 | 12/1989 | Friedman et al. | 342/387 |
| 4,891,650 | 1/1990 | Sheffer | 342/457 |
| 4,908,629 | 3/1990 | Apsell et al. | 342/457 |
| 4,926,161 | 5/1990 | Cupp | 340/572 |
| 4,975,710 | 12/1990 | Baghdady | 342/442 |
| 5,003,317 | 3/1991 | Gray et al. | 342/457 |
| 5,008,679 | 4/1991 | Effland et al. | 342/353 |
| 5,023,809 | 6/1991 | Spackman et al. | 364/516 |
| 5,023,900 | 6/1991 | Tayloe et al. | 379/32 |
| 5,055,851 | 10/1991 | Sheffer | 342/457 |
| 5,095,500 | 3/1992 | Tayloe et al. | 379/32 |
| 5,101,501 | 3/1992 | Gilhousen et al. | 455/33 |
| 5,126,748 | 6/1992 | Ames et al. | 342/353 |
| 5,128,623 | 7/1992 | Gilmore | 328/1 |
| 5,153,902 | 10/1992 | Buhl et al. | 379/60 |
| 5,166,694 | 11/1992 | Russell et al. | 342/457 |
| 5,208,756 | 5/1993 | Song | 364/449 |
| 5,218,618 | 6/1993 | Sagey | 342/457 |

FOREIGN PATENT DOCUMENTS
WO93/06685 9/1992 PCT Int'l Appl. .

OTHER PUBLICATIONS
Smith, William W., "Passive Location of Mobile Cellular Telephone Terminals," IEEE, 1991, pp. 221-225.

*Primary Examiner*—Gregory C. Issing
*Attorney, Agent, or Firm*—Woodcock Washburn Kurtz Mackiewicz & Norris

[57] ABSTRACT

A cellular telephone location system for automatically recording the location of one or more mobile cellular telephones comprises three or more cell site systems 12. Each cell site system is located at a cell site of a cellular telephone system. Each cell site system includes an antenna that may be mounted on the same tower or building as the antenna employed by the cellular telephone system and equipment that may be housed in the equipment enclosure of the corresponding cell site. The cell site systems are coupled via T1 communication links 14 to a central site 16. The central site may be collocated with the cellular telephone system's MTSO. The central site 16 is further coupled to a database 20, which may be remotely located from the central site and made available to subscribers.

45 Claims, 15 Drawing Sheets

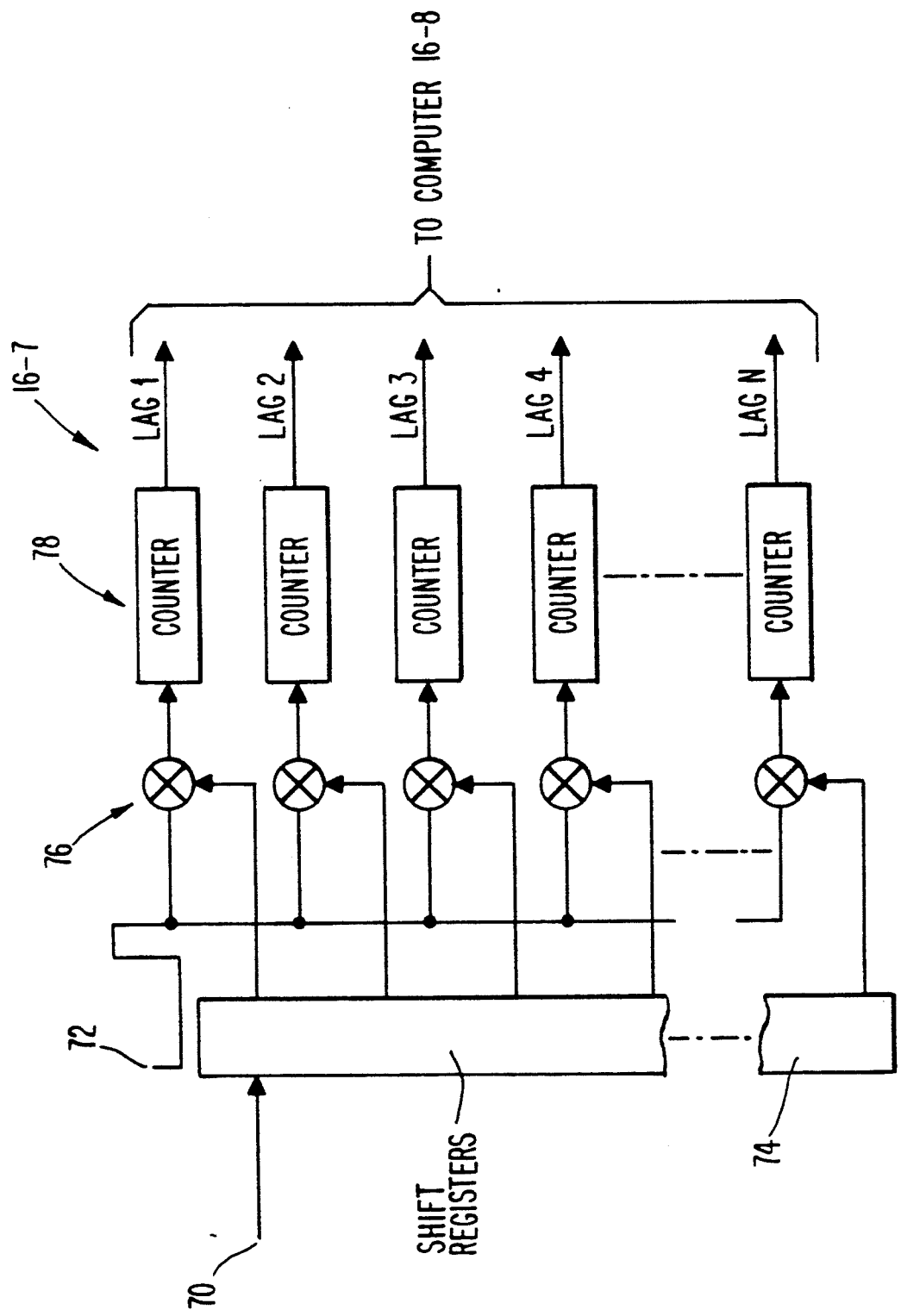

STEP 1

OBTAIN CORRELATIONS

STEP 3
ESTIMATE LOCATION

CELLULAR TELEPHONE LOCATION SYSTEM

FIELD OF THE INVENTION

The present invention relates generally to the field of mobile cellular telephone systems (including both analog and digital cellular systems) and more particularly relates to a system for automatically locating mobile cellular telephones operating within a prescribed geographic area.

BACKGROUND OF THE INVENTION

Prior to the invention disclosed herein, there has been no known system for automatically tracking mobile cellular telephones. Although related technologies (radio navigation systems such as direction finding and LORAN, emergency location devices for aircraft, satellite tracking and surveillance, and the like) have been extant for many years, none of these technologies has been applied to automatically locate cellular telephones as described herein. Accordingly, the background information most pertinent to gaining an understanding of the present invention relates to a cellular telephone system itself, as opposed to the peripherally related radio navigation and location technologies. The following discussion refers to FIGS. 1A-1C in providing an overview of a cellular telephone technology. In addition, it should be noted that the inventive concepts disclosed herein are applicable to both analog and digital (for example, TDMA) cellular systems that employ analog control channels.

Cellular telephone systems typically include many cell sites and a centrally-located cellular switch, called a Mobile Telephone Switching Office (MTSO). There are typically sixty to one hundred cell sites in large cities and fifteen to thirty cell sites in smaller cities. Cell sites are usually spaced at distances of one-half to twenty miles. Each cell site generally comprises one or more antennas mounted on a triangular platform. The platform is placed on a tower or atop a tall building, preferably fifty to three hundred feet above the surrounding terrain.

The fundamental idea behind a cellular system is frequency reuse. This concept of frequency reuse is implemented by employing a pattern of overlapping cells, with each cell conceptually viewed as a hexagon. This concept is illustrated in FIG. 1A, which depicts a layout for a cellular system employing seven distinct sets of frequencies. In this figure, each shading pattern represents a unique frequency set. FIG. 1C schematically depicts the main components and arrangement of cellular telephone system. As discussed above, frequency reuse allows the cellular system to employ a limited number of radio channels to serve many users. For example, FIG. 1A depicts an area served by 14 cells, divided into two clusters. Each cluster contains seven cells. A separate set of channels is assigned to each cell in a cluster. However, the sets used in one cluster are reassigned in the other cluster, thus reusing the available spectrum. The signals radiated from a cell in channels assigned to that cell are powerful enough to provide a usable signal to a mobile cellular telephone within that cell, but preferably not powerful enough to interfere with co-channel signals in distant cells. All cellular telephones can tune to any of the channels.

The Federal Communications Commission (FCC) has allocated a 25 MHz spectrum for use by cellular systems. This spectrum is divided into two 12.5 MHz bands, one of which is available to wire line common carriers only and the other of which is available to non-wire line common carriers only. In any given system, the non-wire line service provider operates within the "A side" of the spectrum and the wire line provider operates within the "B side" of the spectrum Cellular channels are 30 KHz wide and include control channels and voice channels. In particular, the twenty-one control channels for "A" systems are numbered 313 through 333 and occupy a 30 KHz band of frequencies 834.390 MHz to 834.990 MHz. The control channels for "B" systems are numbered 334 through 354 and occupy 835.020 MHz to 835.620 MHz. Each cell site (or, where a cell site is "sectored" as described below, each sector of that cell site) uses only a single control channel. The control channel from a cell site to a mobile unit is called the "forward" control channel and the control channel from the cellular telephone to the cell site is called the "reverse" control channel. Signals are continuously broadcast over a forward control channel by each cell site. In contrast, signals are discontinuously (periodically) broadcast by the cellular telephones over a reverse control channel. If the cell sites are so close to one another that control channels using the same frequency interfere with each other, the control channel at each cell site is further qualified by a digital color code ranging from zero to three. This allows each cell site to be uniquely identified, for example, within a range of twenty to thirty miles.

Directional cell site antennas may be used to reduce co-channel and adjacent-channel interference. FIG. 1B illustrates how sectored antennas may be used to reduce such interference. The circles represent cell sites and the broken lines represent the azimuthal edges of the front lobes of 120° directional antennas. The labels "A", "B", and "C" refer to channel sets, cells, and cell sites simultaneously. The labels "1", "2", and "3" refer to directional antennas and sectors of cells simultaneously. Thus, for example, if a particular channel is assigned to sector 1 of cell B and adjacent channels are assigned to cells A and C, these adjacent channels should be assigned to sector 1 in cells A and C.

When a cellular telephone is first turned on, it scans all forward control channels, listening for the channel with the strongest signal. The telephone then selects the forward control channel with the strongest signal and listens for system overhead messages that are broadcast periodically, for example, every 0.8 seconds. These overhead messages contain information regarding the access parameters to the cellular system. One such access parameter is the frequency of registration, which refers to how often a given telephone must inform the system that the telephone is within the system's geographic confines. Registration frequencies typically range from once per minute to once per thirty minutes.

The overhead messages also contain busy/idle bits that provide information about the current availability of the reverse control channel for that cell. When the reverse control channel becomes free, as indicated by the busy/idle bit, the cellular telephone attempts to register itself by seizing the reverse control channel. Cellular telephones re-register themselves at the rate determined by the cellular system. Registration parameter requirements are determined by each cellular system. For example, the options include (1) 7-digit NXX-XXXX, (2) 3-digit NPA, and (3) 32-bit electronic serial number. Each of these options constitutes a digital word. Because of sync bits and error correction techniques, each digital word is 240 bits long. With an initial 48-bit sync stream, each cellular telephone transmission is a minimum of 288 bits long, and as long as 1488 bits. Moreover, each discontinuous transmission by a cellular telephone includes a period of unmodulated carrier. Therefore, an average transmission on the reverse control channel lasts about 100 milliseconds. Cellular telephones also transmit in response to pages by the cellular system, as well as in response to user-initiated calls. The term "paging" is used to describe the process of determining a mobile telephone's availability to receive an incoming call. The complementary function of initiating a call by the mobile telephone is called "access." The paging and access functions occur on the control channels.

When turned on but not in active use, a mobile cellular telephone periodically scans the control channels assigned to the system and marks for use the strongest carrier found. With the mobile receiver tuned to this strongest carrier, the cellular telephone continuously decodes a digital modulating data stream, looking for incoming calls. Any call to a mobile terminal is initiated like a normal telephone call. A seven- or ten-digit number is dialed and the telephone network routes the call to a central computer. The number is broadcast on the control channels of every cell in the system. When a called telephone detects its number in the incoming data stream, it sends its identification back to the system. The system uses a digital message on the control channel to designate a channel for the telephone to use. The telephone tunes to this channel and the user is then alerted to the incoming call. A similar sequence is involved when a cellular telephone user originates a call. The user dials the desired telephone number into a register in the telephone. This number is transmitted over the control channel to the nearest cell (i.e., the cell with the strongest carrier). The system computer then designates a channel for the call and the mobile unit is automatically tuned to that channel.

The cellular telephone industry has enjoyed widespread success in its relatively brief lifetime. New subscribers, apparently recognizing the many advantages in being able to initiate and receive calls while away from home, are being enrolled in ever-increasing numbers. Indeed, in many cities, the competition between the A and B sides to enlist new subscribers is fierce. Accordingly, there is a great need for new services to offer current and potential subscribers. The present invention sprang from the recognition that mobility, the main advantage offered by a cellular system, is also a disadvantage in certain situations. For example, a lost or stolen cellular telephone is difficult to recover. Thus, a system that could automatically locate the telephone would be quite beneficial to users. In addition, if the cellular telephone were in an automobile and the automobile were stolen, a system that could locate the telephone would also be able to locate the automobile, thus providing a valuable service to users. Moreover, there are situations where the user of a cellular telephone may become lost. An example of such a situation is where the user is driving in an unknown area at night with his telephone in the car. Again, it would be a great advantage for the system to be able to automatically locate the telephone and, upon request, inform the user of his location. Similarly, a cellular telephone user experiencing a medical emergency who dials an emergency telephone number (for example, 911) may not be able to tell the dispatcher his location. Prior art systems are unable to trace a call from a cellular telephone. Therefore, a cellular telephone user in such a situation would be in a dire predicament. Once again, it would be highly advantageous for the system to be able to ascertain the user's location and provide this information to emergency medical personnel. There would be numerous other applications for a system that could automatically locate a cellular telephone.

SUMMARY OF THE INVENTION

The present invention provides a cellular telephone location system for determining the locations of multiple mobile cellular telephones each initiating periodic signal transmissions over one of a prescribed set of control channels. The invention may be embodied in a system that employs much of the existing infrastructure of a cellular system. For example, as described below in greater detail, a cellular telephone location system in accordance with the present invention may employ the cellular system's towers and cell site enclosures. In this sense, the cellular telephone location system may be overlaid on the cellular system.

There are numerous advantages provided by monitoring control channels to track the locations of cellular telephones. First, a voice channel is an expensive and relatively scarce resource. Cellular systems typically require approximately six to eight seconds to allocate a voice channel to a specific telephone. If voice channels were employed for location tracking, the cellular telephone would have to be called and commanded to initiate a voice channel call every time a location sample were to be taken. This would be both expensive and time consuming. Thus, it would be extremely inefficient for a location system to require the telephone to initiate periodic voice channel transmissions. Second, each voice channel transmission adds a call record in an associated billing system. Therefore, a large burden would be placed on the billing system if the location system were to require periodic voice channel transmissions. In contrast, control channel transmissions already occur periodically in cellular systems. Thus, the present invention is compatible with existing cellular telephone protocols and would not require the cellular system or the individual cellular telephones to be modified. Third, since the frequency of control channel transmissions is software controllable, a location system in accordance with the present invention could control the frequency of control channel transmissions and offer different subscribers different location information update rates. Fourth, another advantage afforded by monitoring control channel transmissions is in connection with energy efficiency. Control channel transmissions are very short and require little power in comparison to voice channel transmissions. Accordingly, requiring periodic voice channel transmissions would cause a significant battery drain in the individual cellular telephones. This is avoided by monitoring control channels.

Accordingly, there are significant advantages afforded by monitoring periodic control channel transmissions to automatically locate mobile cellular telephones. However, monitoring control channels requires detection of such weak, short duration signals that have travelled large distances (for example, twenty-five miles). The present inventors have developed highly sophisticated signal processing methods and apparatus to detect extremely brief, low power control channel signals. Both the concept of monitoring periodic control channel transmissions, as opposed to voice channel transmissions, and the particular way in which this function is carried out represent significant technological advancements.

An exemplary embodiment of the present invention comprises at least three cell site systems and a central site system. Each cell site system comprises an elevated ground-based antenna; a baseband convertor for receiving cellular telephone signals transmitted by the cellular telephones and providing baseband signals derived from the cellular telephone signals; a timing signal receiver for receiving a timing signal common to all cell sites; and a sampling subsystem for sampling the baseband signal and formatting the sampled signal into frames of digital data. Each frame includes a prescribed number of data bits and time stamp bits, wherein the time stamp bits represent the time at which the cellular telephone signals were received. The central site system comprises means for processing the frames of data from the cell site systems to generate a table identifying individual cellular telephone signals and the differences in times of arrival of the cellular telephone signals among the cell site systems; and means for determining, on the basis of the times of arrival, the locations of the cellular telephones responsible for the cellular telephone signals.

In one preferred embodiment of the invention, the central site system comprises a correlator for cross-correlating the data bits of each frame from one cell site with the corresponding data bits of each other cell site. In addition, this preferred embodiment comprises a database for storing location data identifying the cellular telephones and their respective locations, and means for providing access to the database to subscribers at remote locations. The system also comprises means for providing location data to a specific cellular telephone user upon request by using, for example, CPDP without setting up a voice call ("CPDP" represents the Cellular Packet Data Protocol, which involves sending data over voice channels when the voice channels would not otherwise be in use). The latter feature is especially useful in connection with laptop or handheld computers having cellular modems and mapping software.

Embodiments of the invention may also advantageously include means for merging the location data with billing data for the cellular telephones and generating modified billing data. In this embodiment, the billing data indicates the cost for each telephone call made by the cellular telephones within a certain time period, the cost being based upon one or more predetermined billing rates, and the modified billing data is based upon a different rate for calls made from one or more prescribed locations. For example, the system may apply a lower billing rate for telephone calls made from a user's home or office or other geographic locale.

Embodiments of the invention may also advantageously include means for transmitting a signal to a selected cellular telephone to cause the selected telephone to transmit a signal over a control channel. Such capability would allow the system to immediately locate that telephone without waiting for one of its periodic control channel transmissions.

In addition, embodiments of the invention may comprise means for automatically sending location information to a prescribed receiving station in response to receiving a distress signal from a cellular telephone. With this capability, emergency assistance may be provided to a user in distress. For example, when a user dials "911" the system would automatically tell an emergency dispatcher the user's location.

Another element of a preferred embodiment is a means for comparing the current location of a given telephone with a prescribed range of locations and indicating an alarm condition when the current location is not within the prescribed range. Such an element could be used, for example, to notify a parent when the child, who borrowed the parent's car and cellular telephone to "go to the mall," has in fact gone somewhere else. Of course, many other applications of such an alarm function are possible.

Yet another element of a preferred embodiment is a means for detecting a lack of signal transmissions by a given telephone and in response thereto automatically paging the given telephone to cause it to initiate a signal transmission. This would allow the system to locate a telephone that has failed to register itself with the cellular system. Such a lack-of-signal-transmission detection feature could be used, for example, to generate an alarm for subscribers at remote locations.

In addition, preferred embodiments may also include means for estimating a time of arrival of a given telephone at a prespecified location. This would be useful, for example, in connection with a public transportation system to provide quasi-continuous estimated times of arrival of busses along established routes. Of course, many other applications of this feature are also possible.

Embodiments of the present invention may also comprise means for continuously tracking a given telephone by receiving voice signals transmitted by the given telephone over a voice channel and determining the location of the given telephone on the basis of the voice signals. This voice channel tracking could be used as an adjunct to control channel tracking. This feature would require the location system to track the channel assignment of each telephone whose location is to be determined. The tracking of channel assignments by the location system could employ the dynamic channel assignment protocol employed by the cellular system.

The present invention also provides methods for determining the location of one or more mobile cellular telephones. Such methods comprise the steps of: (a) receiving the signals at at least three geographically-separated cell sites; (b) processing the signals at each cell site to produce frames of data, each frame comprising a prescribed number of data bits and time stamp bits, the time stamp bits representing the time at which the frames were produced at each cell site; (c) processing the frames of data to identify individual cellular telephone signals and the differences in times of arrival of the cellular telephone signals among the cell sites; and (d) determining, on the basis of the times of arrival, the locations of the cellular telephones responsible for the cellular telephone signals.

One preferred embodiment of the inventive method comprises estimating the location of a cellular telephone by performing the following steps: (1) creating a grid of theoretical points covering a prescribed geographic area, the theoretical points being spaced at prescribed increments of latitude and longitude; (2) calculating theoretical values of time delay for a plurality of pairs of cell sites; (3) calculating a least squares difference (LSD) value based on the theoretical time delays and measured time delays for a plurality of pairs of cell sites; (4) searching the entire grid of theoretical points and determining the best theoretical latitude and longitude for which the value of LSD is minimized; and (5) starting at the best theoretical latitude and longitude, performing another linearized-weighted-least-squares iteration to resolve the actual latitude and longitude to within a prescribed number of degrees or fraction of a degree. Preferably, the calculating step (2) comprises accounting for any known site biases caused by mechanical, electrical, or environmental factors, the site biases determined by periodically calculating the positions of reference cellular transmitters at known locations.

In addition, the least squares difference is preferably given by:

$$LSD = [Q_{12}(Delay\_T_{12} - Delay\_O_{12})^2 + Q_{13} \cdot (Delay\_T_{13} - Delay\_O_{13})^2 + ... Q_{xy}(Delay\_T_{xy} - Delaye\_O_{xy})^2]$$

where, $Delay\_T_{xy}$ represents the theoretical delay between cell sites x and y, x and y being indices representative of cell sites; $Delaye\_O_{xy}$ represents the observed delay between cell sites x and y; $Q_{xy}$ represents a quality factor for the delay measurement between cell sites x and y, the quality factor being an estimated measure of the degree to which multipath or other anomalies may have affected a particular delay measurement.

Further, the inventive method may advantageously include detecting a first leading edge of a cellular telephone signal and rejecting subsequent leading edges of the cellular telephone signal. This allows the system to reduce the effects of multipath.

In addition, preferred embodiments include estimating the velocity (speed and direction) of a cellular telephone by performing steps similar to those performed for location estimation, including: (1) creating a grid of theoretical points covering a prescribed range of velocities, the theoretical points being spaced at prescribed increments; (2) calculating theoretical values of frequency difference for a plurality of pairs of cell sites; (3) calculating a least squares difference (LSD) value based on the theoretical frequency differences and measured frequency differences for a plurality of pairs of cell sites; (4) searching the entire grid of theoretical points and determining the best theoretical velocity for which the value of LSD is minimized; and (5) starting at the best theoretical velocity, performing another linearized-weighted-least-squares iteration to resolve the actual velocity to within a prescribed tolerance.

Other features of the present invention are described below.

BRIEF DESCRIPTION OF THE DRAWINGS

FIG. 6A is a block diagram of a correlator for use in the central site system 16.

DETAILED DESCRIPTION OF PREFERRED EMBODIMENTS

Overview

Preferred embodiments of the present invention comprise a network of receivers located at multiple cell sites in a cellular system. These receivers listen to the mobile control channel commands/responses normally occurring in the cellular system and estimate the physical location of each cellular telephone operating within the system. Based upon the known identity of each telephone, obtained from listening to the control channel, and the estimated physical location of the telephone, the system provides a continuous, real time data stream to a database. The database may be collocated with the cellular switch or may be in some other convenient location. The data stream provided to the database comprises a set of numbers, the first number being the telephone number of the telephone, the second number being the estimated latitude, longitude, and altitude of the transmitter, and the third number being the time stamp of the measurement. The database software that processes the data stream may be maintained by the operator of the location system rather than the operator of the cellular telephone system, if the two are not the same.

The location system operates by using the frequencies assigned to the control channels of the cellular system. Cellular telephones use these control channels to maintain regular contact with the cellular system, with the time between each contact being typically no more than thirty minutes and generally about ten minutes. Each control channel comprises a 10 kbps Manchester encoded data stream. There is only one control channel used per cellular sector or omni cell site. The location system is capable of functioning by listening only to the control channel broadcasts of the cellular telephones; it does not depend on control channel broadcasts from the cell sites. The location system preferably comprises equipment that is located atop cellular towers (although the equipment may be located on other tall structures), in the equipment enclosure at cells sites, and at the central switch site(s).

Figure 1A:
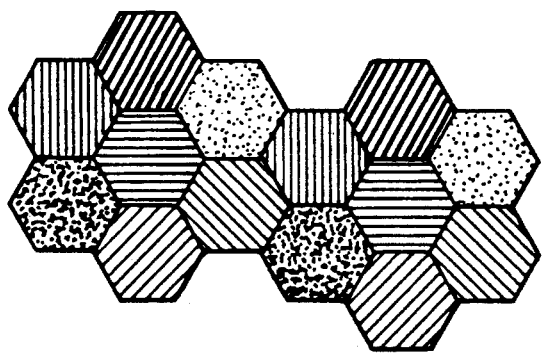
FIG. 1A is a depiction of an exemplary frequency reuse pattern employed in a cellular telephone system.
Figure 1B:
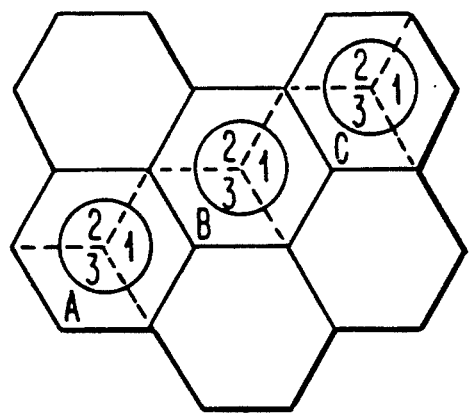
FIG. 1B is a schematic depiction of an exemplary channel assignment pattern where cell sectoring is employed.
Figure 1C:
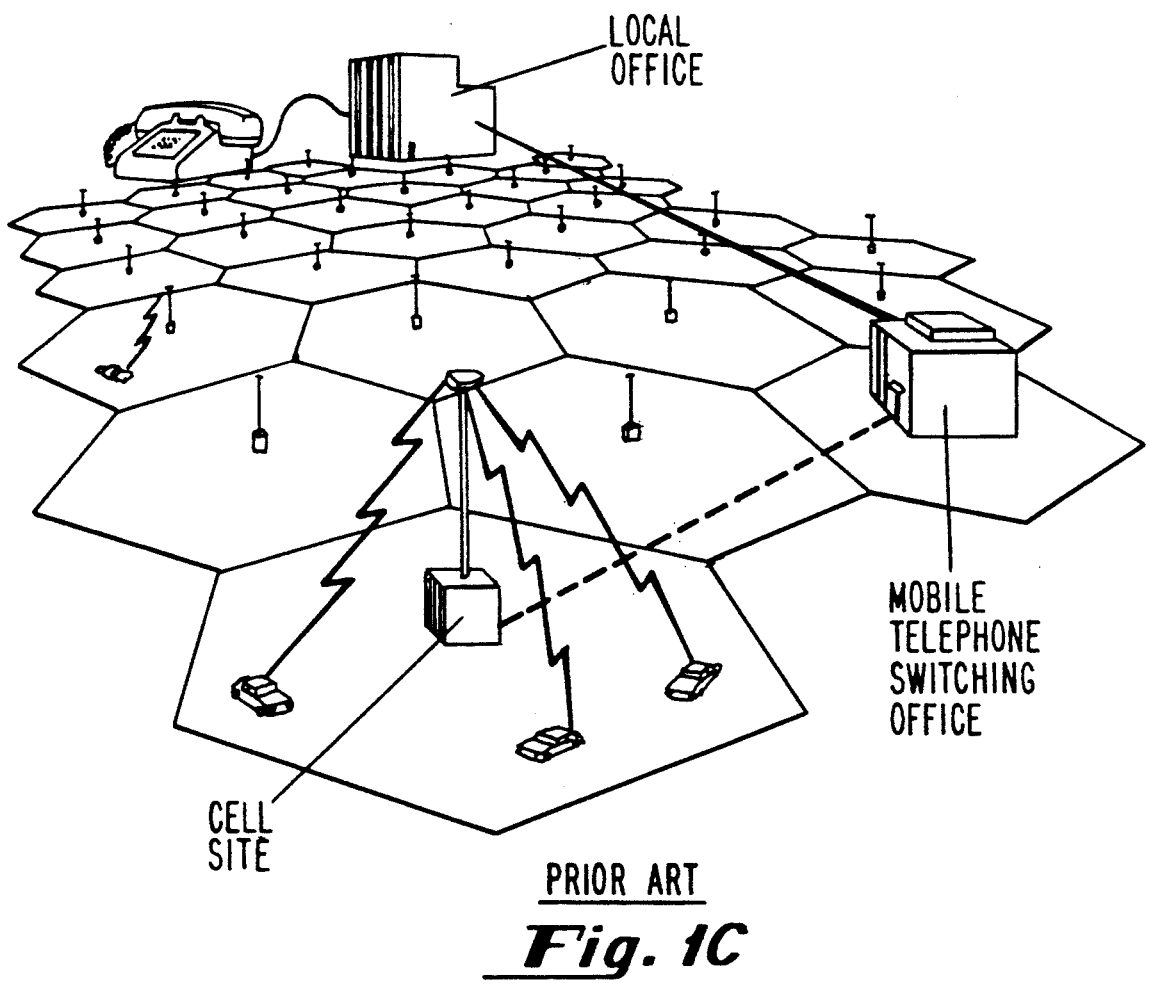
FIG. 1C is a schematic depiction of the basic components of a cellular telephone system.
Figure 2:
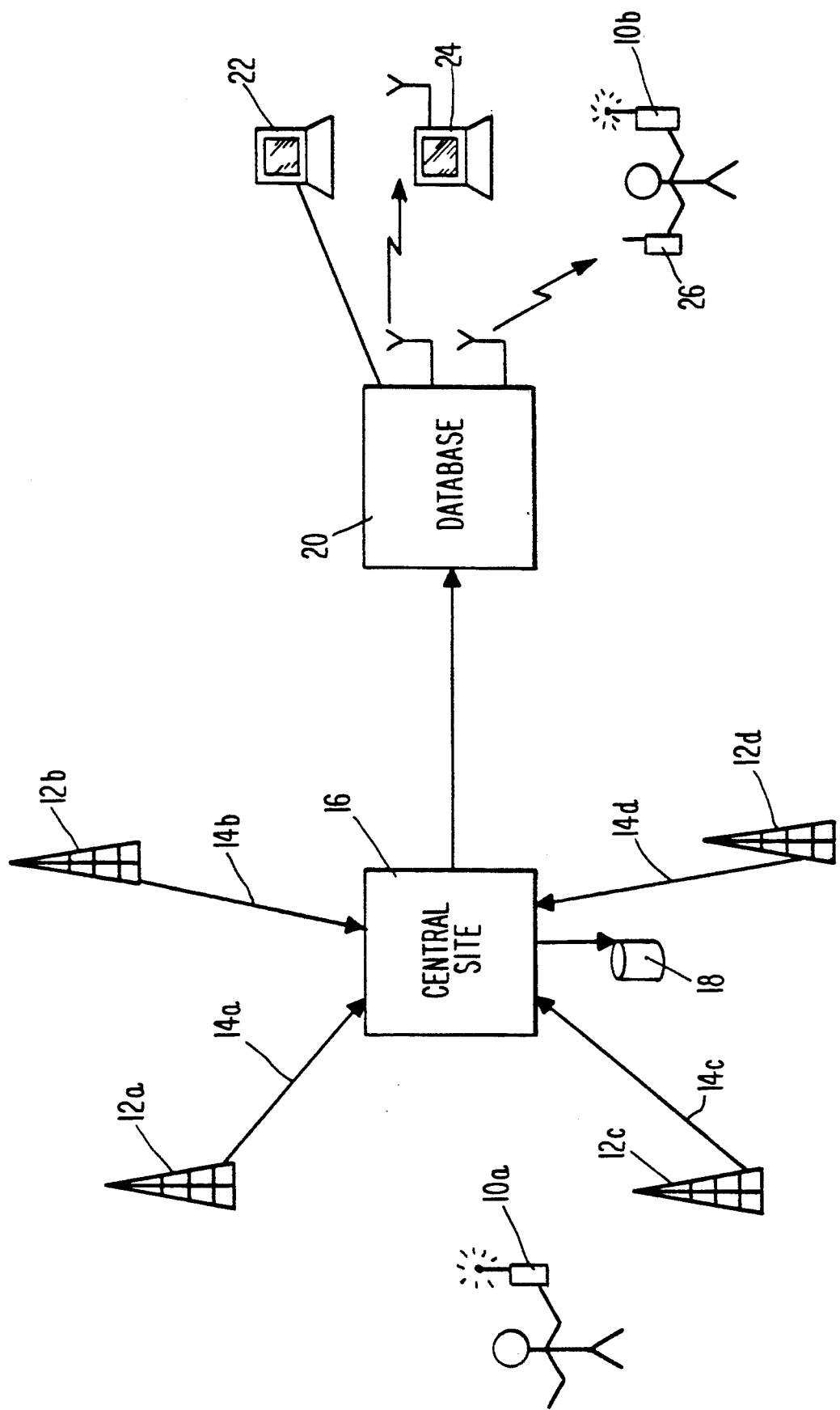
FIG. 2 is a schematic diagram of a cellular telephone location system in accordance with the present invention.

Referring now to FIG. 2, a cellular telephone location system in accordance with the present invention comprises at least three, and preferably more, cell site systems 12a, 12b, 12c, 12d. (It should be noted that this figure, as well as the other figures, is simplified in that some elements and interconnections have been omitted.

However, the instant specification and attached drawings are sufficient to enable one skilled in the art to make and use the invention disclosed herein.) Each cell site system may be located at a cell site of the cellular telephone system; however, this is not required since additional antenna and receiving equipment could be deployed at locations not well covered by cell sites. FIG. 2 also shows a user with a cellular telephone 10a. As described below, each cell site system includes an antenna that may be mounted on the same tower or building as the antenna employed by the cellular telephone system. In addition, each cell site system includes equipment (described below) that may be housed in the equipment enclosure of the corresponding cell site. In this manner, the cellular telephone location system may be overlaid on the cellular telephone system and thus may be implemented inexpensively. The cell site systems 12a, 12b, 12c, 12d are coupled via communication links 14a, 14b, 14c, 14d (for example, T1 communication links) to a central site 16. The central site 16 may be collocated with the cellular telephone system's MTSO. The central site 16 may include a disk storage device 18.

The central site 16 is further coupled to a database 20, which may be remotely located from the central site and made available to subscribers. For example, FIG. 2 depicts a first terminal 22 coupled via a modem (not shown) and telephone line to the database 20; a second terminal 24 in radio communication with the database 20; and a third, handheld terminal 26, which is carried by a user who also has a cellular telephone 10b, in radio communication with the database. The user with the cellular telephone 10b and handheld terminal 26 may determine his own location by accessing the database. The handheld terminal 26 may include special mapping software for displaying the user's location, for example, on a map, on the terminal 26. Moreover, the cellular telephone and handheld terminal could be combined into one unit.

Cell Site Systems

Figure 3:
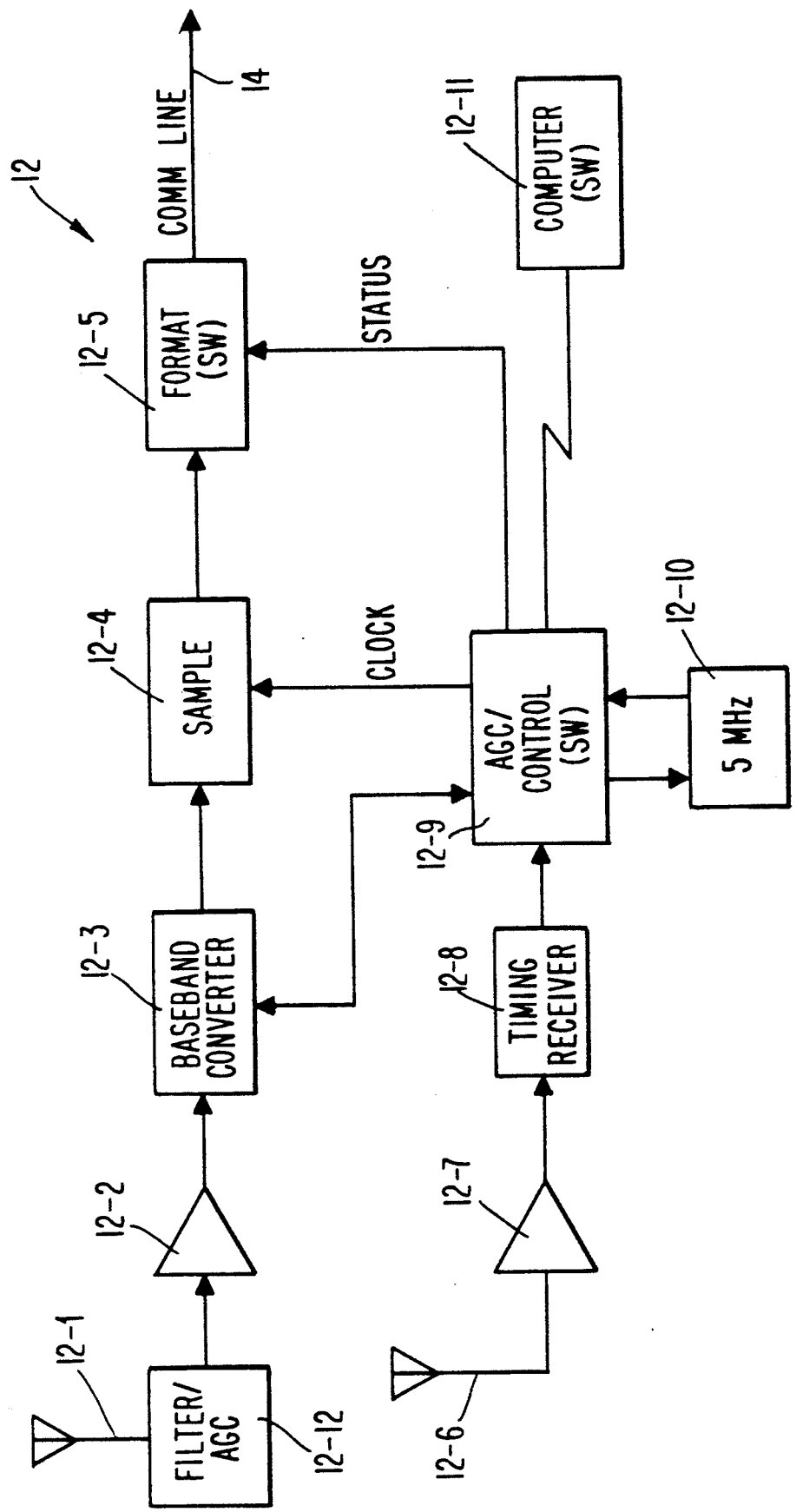
FIG. 3 is a block diagram of one preferred embodiment of a cell site system 12.

FIG. 3 is a block diagram of one presently preferred embodiment of a cell site system 12. Before discussing the exemplary cell site system depicted in this figure, it should be noted that there are two alternative preferred embodiments for the equipment at each cell site, with the particular embodiment for a particular cellular system dependent upon desired cost.

The first embodiment is the most preferred embodiment, and comprises (1) an antenna suited for receiving signals in the cellular frequency band; (2) a low delay bandpass filter with a bandwidth of 630 KHz located within ten to fifteen feet of the cellular antenna for removing adjacent channel interference; (3) an amplifier of sufficient gain to compensate for cable loss in the distance from the amplifier to the next filter, which is typically the height of the antenna tower plus any horizontal distance over which the cable is routed; (4) a set of twenty-one individual low delay bandpass filters, each with a bandwidth of 30 KHz centered about one of the twenty-one control channels; and (5) a set of twenty-one automatic gain control circuits with a dynamic range of 70 dB (note that not all of these components are depicted in FIG. 3). This embodiment is preferred because of its superior interference discrimination and rejection.

The second embodiment comprises (1) an antenna suited for receiving signals in the cellular frequency band; (2) a low delay bandpass filter of bandwidth 630 KHz located within ten to fifteen feet of the cellular antenna for removing adjacent channel interference; (3) an amplifier of sufficient gain to compensate for cable loss in the distance from the amplifier to the next filter, which is typically the height of the antenna tower plus any horizontal distances over which the cable is routed; (4) a second low delay bandpass filter of bandwidth 630 KHz; and (5) an automatic gain control circuit with a dynamic range of 70 dB.

Referring now to FIG. 3, one exemplary embodiment of a cell site system 12 includes a first antenna 12-1 that is mounted at an elevated location, preferably on the same structure employed by the cellular telephone system to mount a cell site antenna. The first antenna 12-1 may be independent of the cellular system or may be the antenna employed by the cellular system; i.e., the location system may take a fraction of the signal from the cellular system's antenna. A filter/AGC element 12-12 could advantageously be located near the antenna 12-1. This would reduce cable losses caused by conducting the RF signal over coaxial cable from the antenna to the cell site receiving equipment. The cell site system 12 further includes an amplifier 12-2 (as discussed above, the amplifier 12-2 may advantageously include sets of filtering and AGC circuits, one for each control channel); a baseband converter 12-3; a sample block 12-4, which includes an upper sideband sampler and a lower sideband sampler; a format block 12-5 (which may be implemented in software); a second antenna 12-6, used to receive timing data, for example, from a global positioning system (GPS); an amplifier 12-7; a timing signal (for example, GPS) receiver 12-8; an automatic gain control (AGC)/control block 12-9; a 5 MHz oscillator 12-10; and a computer 12-11. The cell site system 12 is coupled to the central site 16 (FIG. 2) via a communications line 14.

The cell site system 12 receives one or more cellular telephone signals transmitted over a control channel from one or more cellular telephones, converts these signals to baseband signals, samples the baseband signals (wherein the sampling frequency is determined by a clock signal provided by AGC/control block 12-9), and formats the sampled signals into frames of data of a prescribed format. The format of the data frames is described below with reference to FIG. 5. The data frames are processed at the central site as described below.

The 5 MHz oscillator 12-10 provides a common reference frequency for all cell site equipment. Its frequency is controlled by the controller 12-9 based on measurements made by the controller of the time interval between reception of the one second mark signal from the timing signal receiver 12-8 and an internally generated one second mark signal.

The computer 12-11 performs three distinct functions concurrently:

(1) It reads the output of square law detectors 54 and 60 inside the baseband convertor 12-3 (see FIG. 4 and discussion below) and then calculates the proper control signals to be sent to filter boards 48 and 50 (FIG. 4) to adjust the gain and attenuation on these boards with the goal of maintaining their output power at a constant level.

(2) It receives a signal at each occurrence of a one second mark signal from timing signal receiver 12-8. At this time, it reads from controller 12-9 the difference in times of arrival of the one second mark signal from the timing signal receiver 12-8 and a corresponding one second mark signal internal to controller 12-9. The one second mark signal internal to the controller 12-9 is generated from the 5 MHz oscillator 12-10. The computer then calculates a signal to be sent back to the 5 MHz oscillator to alter its frequency of oscillation with the goal of causing the timing receiver's one second mark signal and the internally generated one second mark signal to occur simultaneously.

(3) It calculates the information to be encoded in the status bits (see FIG. 5) and sends that information to the controller 12-9.

Figure 4:
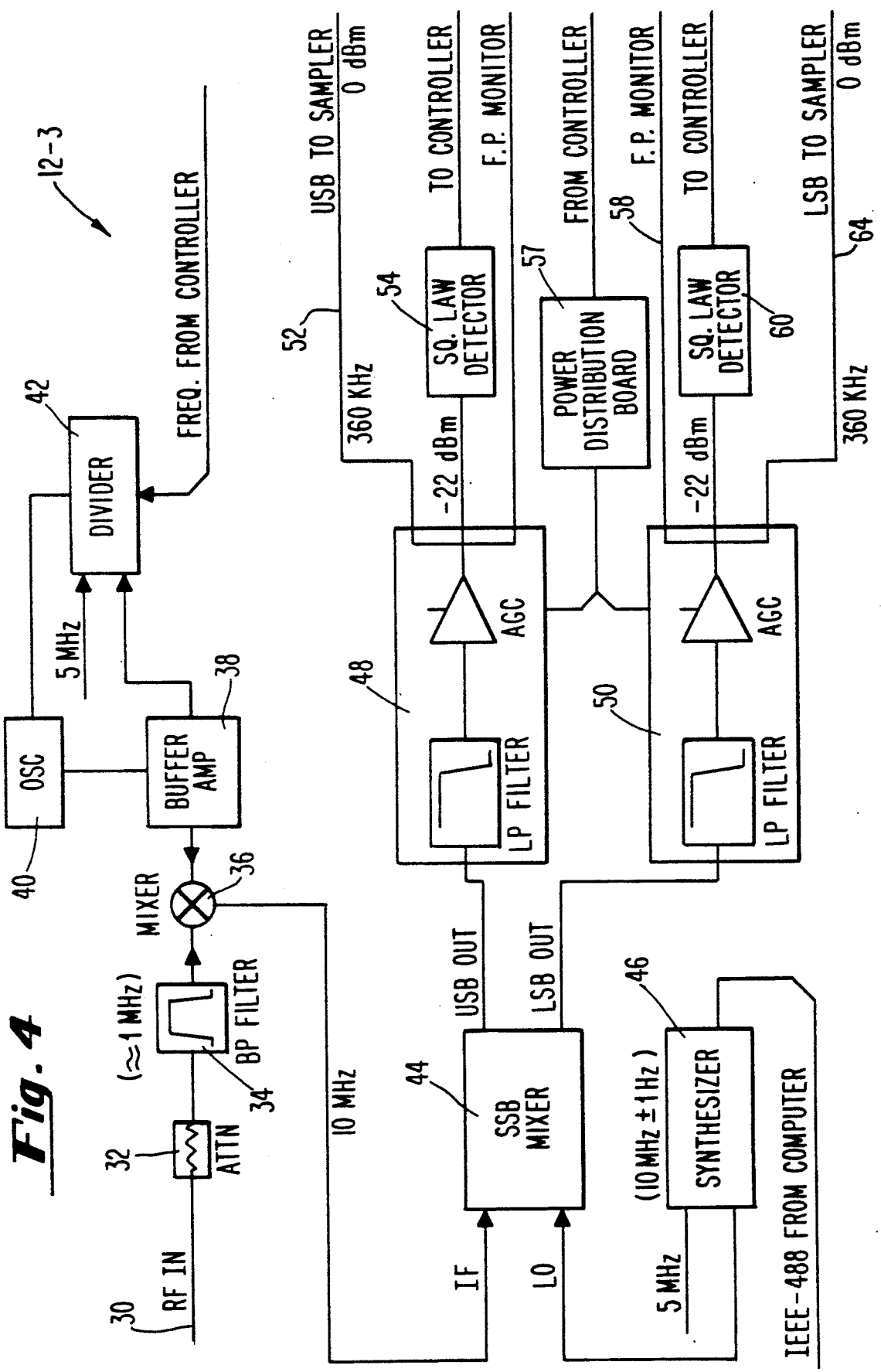
FIG. 4 is a block diagram of one preferred embodiment of a baseband converter 12-3.

Referring to FIG. 4, one preferred embodiment of the baseband convertor 12-3 includes an RF input connector 30 to which the elevated ground-based antenna 12-1 (FIG. 3) is connected (via amplifier 12-2 and filter/AGC 12-12), followed by an attenuator 32 and bandpass filter 34, which sets the level and restricts the frequency response of the baseband convertor. The filter 34 is followed by a single sideband mixer 36 that mixes the RF frequency down to a first IF frequency by action of a local oscillator signal from buffer amplifier 38. The IF frequency in the preferred embodiment is in the vicinity of 10 MHz. The output of the buffer amplifier 38, in addition to being directed to mixer 36, is also directed to the divider 42, where it is compared with a 5 MHz reference frequency from the controller 12-9 (FIG. 3). The output of divider 42 is used to control the frequency of an oscillator 40 so that the collective action of oscillator 40, divider 42, and buffer amplifier 38 provides a local oscillator signal that is phase locked to the 5 MHz reference frequency from the controller 12-9. The signal at the first IF frequency is then directed to single sideband mixer 44, where it is mixed down to a baseband frequency by the action of a computer controlled synthesizer 46. Synthesizer 46 is also phase locked to the 5 MHz signal from the controller. The upper sideband (USB) output of mixer 44 is then directed to filter/automatic gain control (AGC) amplifier 48, where it is filtered and its power is continually adjusted to a nominal value. The lower sideband (LSB) output of mixer 44 is similarly acted upon by filter/AGC amplifier 50. The output of the filter/AGC amplifier 48 includes a 375 KHz signal at 0 dBm directed to the upper sideband sampler (which is part of sample block 12-4) on wire 52, a separate output at −22 dBm directed to a square law detector 54, and a separate output directed to a front panel monitor (not shown). The output of the filter/AGC amplifier 50 includes a 375 KHz signal at 0 dBm directed to the lower sideband sampler on wire 64, a separate output at −22 dBm directed to a square law detector 60, and a separate output directed to the front panel monitor. The baseband converter 12-3 also includes a power distribution board 57 that provides power to the filter/AGC circuits 48, 50.

Figure 5:
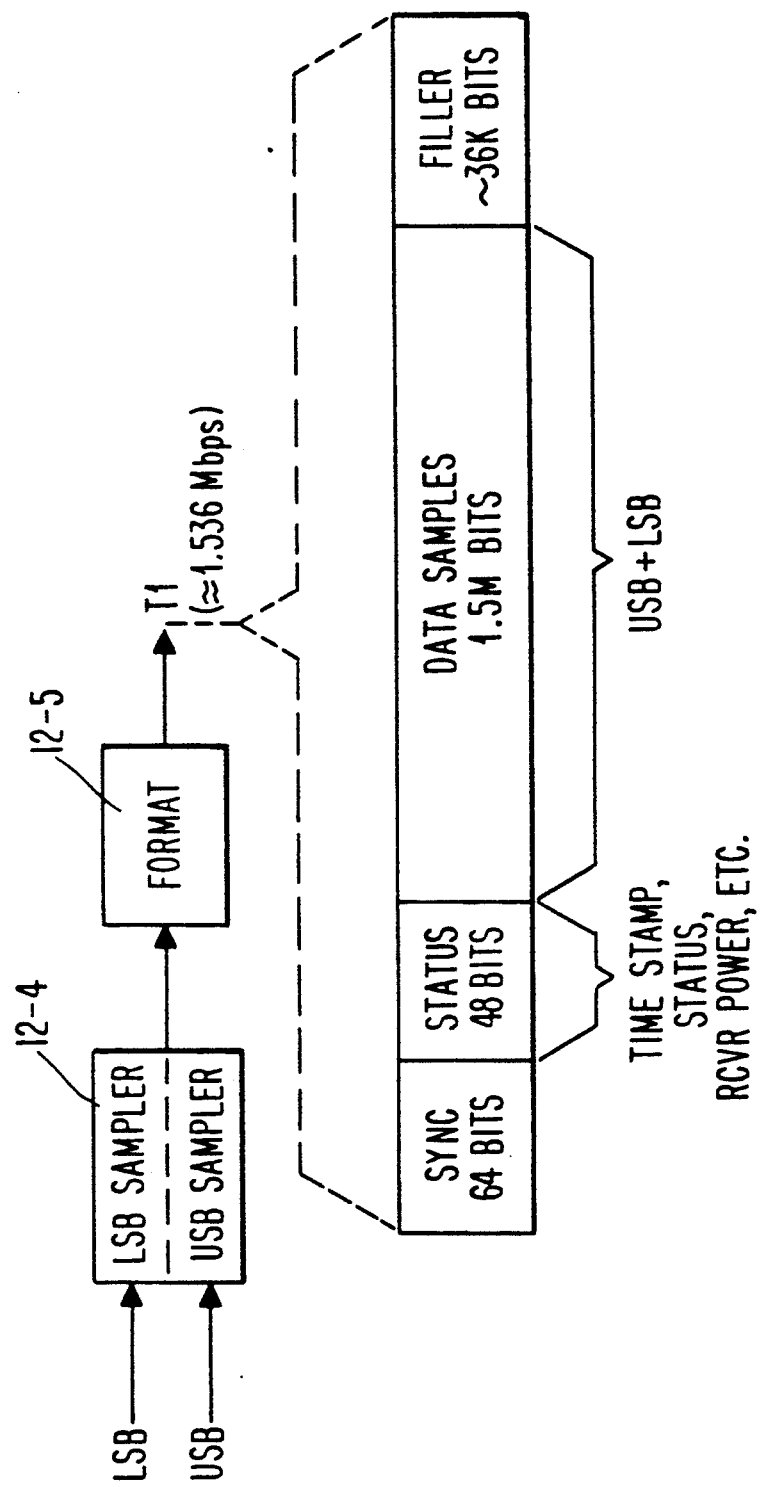
FIG. 5 is a schematic diagram of the data format provided by a format block 12-5.

FIG. 5 depicts a presently preferred format of the data provided by the format block 12-5 to the central site 16 (FIG. 2) via the communications line 14. As shown, the format block 12-5 provides approximately 1.536 Mbps of data to the communications line. Each frame includes 64 sync bits, 48 status bits, 60 kb of sample data (1.5 Mbs divided by 25 frames per second), and approximately 3.6 kb of "filler" data. The 1.5 Mb of sample data represent the upper sideband and lower side signal samples. The status bits include a time stamp representing the exact time the frame of data was created (which is essentially the same as the time the RF signal was received at the cell site in question).

Central Site System

Figure 6:
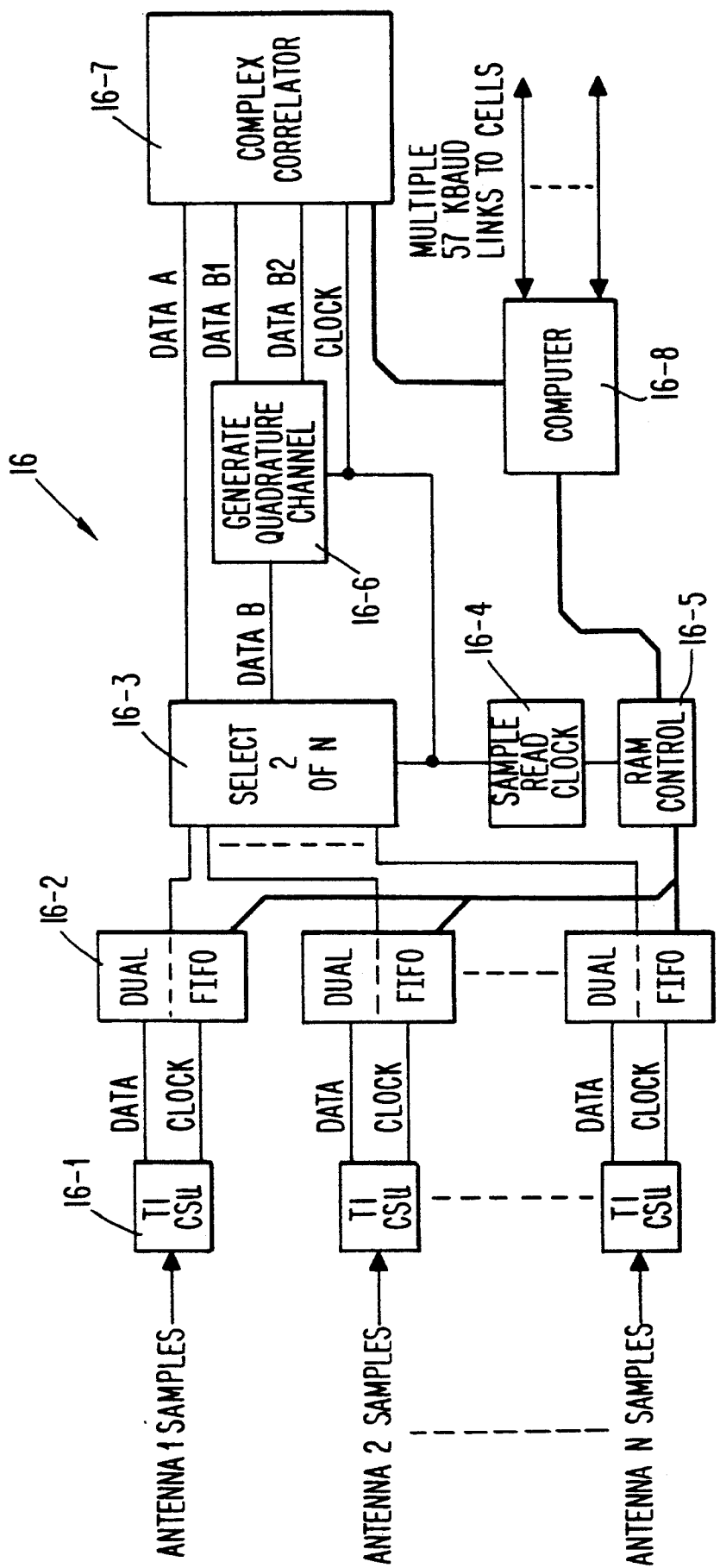
FIG. 6 is a block diagram of one preferred embodiment of a central site system 16.

FIG. 6 is a block diagram of the central site system 16. In one preferred embodiment, the central site system includes sixteen data inputs each connected to a T1 channel from one of the cell sites. Each data input is connected to interface/deformatting circuitry 16-1 (for example, a T1 CSU) which receives the bipolar T1 signal and outputs data bits and a clock signal. The data bits from each channel are clocked into a FIFO 16-2 by the clock signal from that channel. A computer 16-8 selects two of the channel FIFOs through a "select 2 of N" switch 16-3. A sample read clock 16-4 is controlled by the computer 16-8 and a RAM control 16-5 to read sample bits from the previously selected FIFOs. The output of one selected channel FIFO is called "DATA A," and the output of the other selected channel FIFO is called "DATA B." For the DATA B samples, a quadrature channel is calculated by means of an approximate Hilbert transform in the quadrature channel generator 16-6, resulting in in-phase output B1 and quadrature phase output B2. A complex correlator 16-7 is then used to calculate the correlation coefficient of the DATA A and DATA B1 signals, and the DATA A and DATA B2 signals, as a function of the time delay introduced between the DATA A, DATA B1 and DATA A, DATA B2, respectively. The complex correlator may be implemented in hardware or software, or a combination of hardware and software, although hardware is presently preferred because it provides greater processing speed. (One exemplary embodiment of the complex correlator is described below with reference to FIG. 6A.) The computer 16-8 is used to read the resulting correlations periodically. The correlation process, comprising switching the select 2 of N switch, reading the FIFOs, generating quadrature samples, and correlation, is fast enough that a single complex correlator 16-7 can be used to sequentially process all pairs among the sixteen data input channels.

Because cellular signals are generally weak (e.g., as weak as 6 mW at the cellular telephone), a reliable and accurate method is required to detect the signal at as many cell sites as possible, and then to accurately time the same edge of the received signal at each cell site. This ability to accurately time the arrival of the signal is critical to calculating the delays between pairs of cell sites, and therefore to calculate position.

Referring now to FIG. 6A, the predetection cross-correlation method employed in preferred embodiments of the present invention involves inputting a sampled strong cellular signal from a first cell site to an input 72 and inputting a delayed sampled cellular signal from any of second, third, fourth, etc., cell sites to an input 70. The correlator may be embodied in either hardware or software, as economics dictate for a particular system. The correlator preferably includes sixteen channels of shift registers 74, two-bit multipliers 76, and counters 78. Multiple correlators may be used in series, with each correlator passing bits through its shift register to the next correlator, creating multiple delay channels.

The sampled cellular signal from a second cell site is input to the chained shift registers 74. The outputs from the registers are then applied simultaneously to all two-bit multipliers. For each delay channel, the signal input at 70 delayed by a prescribed number of sample periods is applied to each multiplier along with the sampled cellular signal input at 72. The outputs of the multipliers 76 are input to summation circuitry, comprising twenty-four-bit counters 78. The output of each counter is proportional to the strength of the cross-correlation for a particular relative delay.

By using a plurality of delays, or correlation channels, a large range of relative delays can be measured simultaneously. The number of "lags" required is based upon the geographic area to be searched, in terms of position determination, the speed of light, and the bandwidth of the received signal being applied to the correlator. For example, in the embodiment described above, the control channels are grouped into an upper and lower sideband, each with a bandwidth of 375 KHz. This signal must be sampled at the minimum Nyquist rate or greater, for example, 750 Kbps. If an area of 100 kilometers is to be searched, the number of lags required is $$\frac{2 \times 100 \text{ kilometers}}{3 \times 10^5 \text{ kilometers/sec}} \times 750,000 \text{ s}^{-1} = 500 \text{ lags}$$

As discussed above, another embodiment employs individual receivers for each cellular control channel. If this signal were sampled at 71.428 KHz, the number of lags required would be:

$$\frac{2 \times 100 \text{ kilometers}}{3 \times 10^5 \text{ kilometers/sec}} \times 71,428 \text{ s}^{-1} = 48 \text{ lags}$$

Location System Operation

1. Overview

Figure 7:
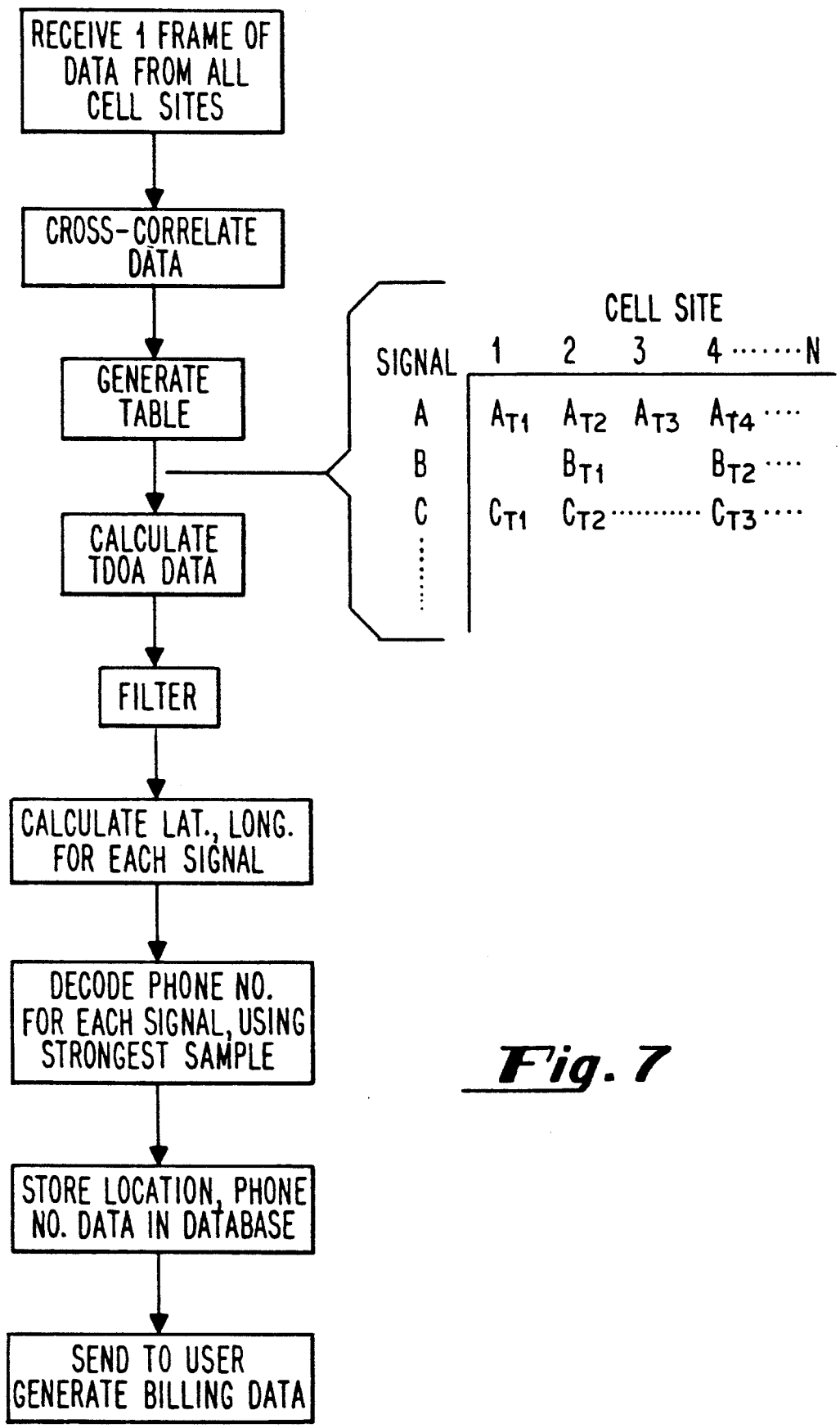
FIG. 7 is a simplified flowchart of a preferred operating sequence of the central site system.

FIG. 7 is a simplified flowchart of the processing performed by the central site system 16. (A detailed flowchart of the signal processing is provided by FIGS. 8A-8E.) First, this system receives a frame of data from each of the cell sites. Next, each frame from a given cell site (or the sampled signal portion of each frame) is cross-correlated with each corresponding frame (or the sample portion of each other frame) from the other cell sites. (The term "corresponding" refers to frames being associated with the same interval of time). Next, the system generates a table of data identifying the individual signals received by the cellular telephone location system during the interval of time represented by the frames of data currently being processed, the individual signals being represented by the letters "A", "B", "C" in FIG. 7. The table further identifies the times of arrival of the signals at each cell site. These times of arrival are represented by the subscripts "T1", "T2", "T3". The system therefore identifies the signals received from one or more cellular telephones during a certain interval of time, and further identifies the time that such signals arrived at the respective cell sites. This information is then used to calculate time difference of arrival (TDOA) and frequency difference of arrival (FDOA) data, the latter being employed to estimate velocity. This data is then filtered to remove points the system judges to be erroneous. Next, the filtered TDOA data is employed to calculate the location (for example, in terms of latitude and longitude) of the individual cellular telephone responsible for each signal A, B, C. Next, the system decodes the telephone number corresponding to each cellular telephone whose location has been determined. The decoding of the telephone number may be accomplished with software in computer 16-8 or in hardware (not shown) located at the cell sites. The system employs the strongest sample (highest power) of each signal to determine its telephone number. Thereafter, the location and telephone number data for each telephone is written to the database 20 or stored locally via the local disk storage device 18 (FIG. 2). Finally, the data may be provided to a user, dispatcher, or billing system. The fields (data) sent to the user, dispatcher, or billing system would preferably include the data bits representing the dialed digits, the status bits, and the message type from the standard cellular control channel message. The data bits could be used by the user or a dispatcher to send coded messages to a display terminal. Thus, in addition to the location services, the location system could provide a limited form of messaging at no incremental cost.

It should be noted that the expression "time difference of arrival," or TDOA, may refer to the time of arrival of a cellular telephone signal at one cell site (for example, cell site A) as determined by a clock reading at that cell site minus the time of arrival of the same cellular telephone signal at a second cell site (cell site B) as determined by a clock reading at the second cell site. This analysis would be carried out for all pairs of cell sites A, B. However, the individual times of arrival need not be measured; only the difference between the signals, times of arrival at the cell sites of a given pair is required. In addition, frequency difference of arrival, or FDOA, refers to the frequency of the cellular signal at a first cell site (cell site A), measured by comparison (effectively) with the cell site's 5 MHz oscillator signal, minus the same quantity for another site (cell site B). The TDOA data may be used to estimate the latitude and longitude of the cellular telephone by calculating that latitude and longitude for which the sum of the squares of the difference between the observed TDOA and the TDOA calculated on the basis of the cell site geometry and the assumed cellular telephone location is an absolute minimum, where the search of trial latitudes and longitudes extends over the entire service area of the system. The FDOA data may be used to measure the velocity (speed and direction of motion) of the cellular telephone. The velocity estimation may be carried out in manner similar to the location estimation.

2. Control Channel Signal Detection

The inventive method for detecting extremely weak control channel signals has two preferred embodiments, the selection of which is dependent on the desired capital and operating costs for implementing any particular system. Both methods compensate for the variability of a particular cellular signal. That is, a transmission on the control channel is comprised of multiple fields, such as the cellular telephone number, the electronic serial number, any dialed digits, the message type, and status and other bits, which make a cellular signal variable. Therefore, the signal cannot be compared against any stored signal because each transmission is potentially unique.

Figure 7A:
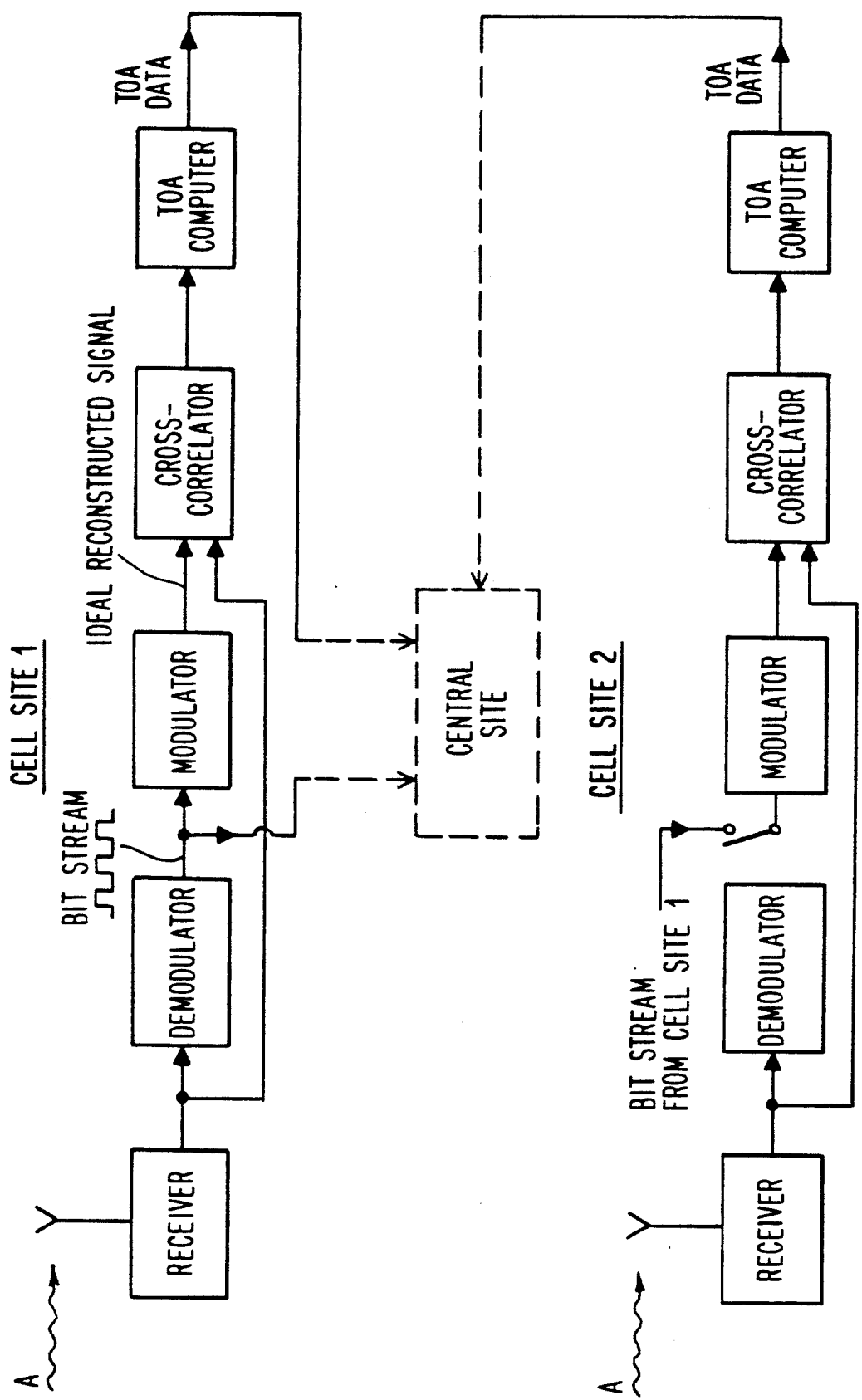
FIG. 7A is a block diagram depicting exemplary embodiments of cell site systems employed in a location system which performs cross-correlations at the cell sites.

In method one, the cell site systems are of higher capital cost, but the communication links are of lower speed, for example, 56 Kbps, and therefore lower operational cost. FIG. 7A schematically depicts this method by illustrating the functional components of the cell site systems. In this method, cross-correlations are performed at the cell sites in the following manner. For each "strong" signal (e.g., signal "A") received on a particular control channel at a particular first cell site (where "strong" is at least several dB above the noise level), that strong signal is first applied to a signal decoder, such as that used by the cellular system itself. This decoder demodulates the cellular signal to produce the original digital bit stream which had been modulated to produce the cellular signal. If the decoder cannot demodulate the digital stream within allowable error thresholds, this strong signal is rejected as a starting point for the remaining part of this process. This digital bit stream is then modulated by the cell site system to reconstruct the original signal waveform as it was first transmitted by the cellular telephone. This reconstructed signal waveform is cross-correlated against the received signal at the first cell site. The cross-correlation produces a peak from which an exact time of arrival can be calculated from a predetermined point on the peak.

The first cell site system then sends the demodulated digital bit stream and the exact time of arrival to the central site over the communications line. The central site then distributes the demodulated digital bit stream and the exact time of arrival to other cell sites likely to have also received the cellular transmission. At each of these other second, third, fourth, etc., cell sites, the digital bit stream is modulated by the cell site system to reconstruct the original signal waveform as it was first transmitted by the cellular telephone. This reconstructed signal waveform is cross-correlated against the signal received at each cell site during the same time interval. In this case, the same time interval refers to a period spanning several hundred to several thousand microseconds of time in either direction from the time of arrival of the strong signal at the first cell site. The cross-correlation may or may not produce a peak; if a peak is produced, an exact time of arrival can be calculated from a predetermined point on the peak. This exact time of arrival is then sent via the communications line to the central site, from which a delay difference for a particular pair of cell sites can be calculated. This method permits the cell site systems to extract time of arrival information from an extremely weak signal reception, where the weak signal may be above or below the noise level. In addition, cross-correlating at cell sites enables the cell site systems to detect a first leading edge of a cellular telephone signal and to reject subsequent leading edges caused by multipath. The value of this technique for reducing the effects of multipath will be appreciated by those skilled in the art. This method is applied iteratively to sufficient pairs of cell sites for each strong signal received at each cell site for each sample period. For any given telephone transmission, this method is only applied once. The results of the delay pairs for each signal are then directed to the location calculation algorithm.

In method two, the cell site systems are of relatively low cost, as they are primarily responsible for sampling each of the control channels and sending the sampled information back to the central site. However, because no correlation is performed at the cell site, all sampled data must be sent back to the central site. This requires a high speed communications line, for example, a T1 line. The central site receives data from all cell sites over identical communications lines, where the data has been sampled and time stamped using the same time reference (derived from timing receiver). This method is applied iteratively to sufficient pairs of cell sites for each strong signal received at each cell site for each sample period. This method is only applied once for any given telephone transmission. The results of the delay pairs for each signal are then directed to the location calculation algorithm described below.

3. Location Calculation

A preferred algorithm used for calculating the location of a cellular telephone is an iterative process. The first step of the process involves creating a grid of theoretical points covering the geographic area of the cellular telephone system. These points may be, for example, at ¼ minute increments or some other increment of latitude and longitude. From each of these theoretical points, the theoretical values of delay are calculated for each relevant pair of cell sites. In calculating the theoretical values of delay, any known site biases are incorporated into the calculation. Known site biases can be caused by any number of mechanical, electrical, or environment factors and may vary from time to time. The site biases are determined by periodically locating the positions of reference cellular transmitters. Since the reference transmitters are, by definition, at known locations, any variance in the calculated position of the transmitter from the known position is assumed to have been caused by permanent or temporary site biases. These site biases are assumed to also affect the measurements of the unknown positions of cellular telephones.

Once the theoretical delays are calculated from each theoretical point on the grid, a least squares difference calculation is performed between the theoretical delays and the actual observed delays for each pair of cell sites for which delays could be determined by correlation. The least squares calculation takes into consideration a quality factor for each actual delay measurement. The quality factor is an estimated measure of the degree to which multipath or other anomalies may have affected that particular delay measurement. (This quality factor is described below.) Therefore, the least squares difference equation takes the form:

$$LSD = [Q_{12}(Delay\_T_{12} - Delay\_O_{12})^2 + Q_{13} \cdot (Delay\_T_{13} - Delay\_O_{13})^2 + ... Q_{xy}(Delay\_T_{xy} - Delay\_O_{xy})^2]$$

where, $Delay\_T_{xy}$ is the theoretical between cell sites x and y; $Delay\_O_{xy}$ is the observed delay between cell sites x and y; $Q_{xy}$ is the quality factor the delay measurement cell sites x and y; and LSD is the least squares difference value that is absolutely minimized over the cellular system's geographic area.

The algorithm searches the entire grid of theoretical points and determines the best theoretical point for which the value of LSD is minimized. Starting at this best theoretical latitude-longitude, the algorithm then performs another linearized-weighted-least-squares iteration similar to the above-described process to resolve the actual latitude-longitude to within 0.0001 degrees, or any other chosen resolution. By performing the calculation of latitude-longitude in two steps, the amount of processing required may be greatly reduced over other approaches.

Those familiar with the art will note that this iterative method of determining position automatically incorporates geometric dilution of precision (GDOP) considerations into the calculation of the position of the cellular telephone. That is, no separate GDOP table is required since both iterations in the calculation of the grid of theoretical delay values also calculate error values.

Cellular telephone signals are subject to multipath and other impairments in travelling from the cellular telephone to the various cell sites. Therefore, the methods described herein incorporate compensation for multipath. As described above, the symbol rate of the digital bit stream of the cellular control channel is 10 Kbps, which has a bit time of 100 microseconds. Published multipath studies have shown typical multipath delays of 5 to 25 microseconds in urban and suburban settings. The present inventors have discovered that the typical effect of multipath in this case would be to lengthen the bit times of the digital data streams and that the correlation algorithms described above can determine the degree to which a particular transmission has been impaired. As mentioned above, when a cross-correlation is performed, a quality factor $Q_{xy}$ may be calculated based upon the size of the peak generated by the cross-correlation and the width of the peak, where $Q_{xy}$ is the quality factor for a particular delay value measurement for a particular pair of cell sites. This quality factor is useful to weight the least squares calculation used in position determination and thereby mitigate the effects of multipath.

Figure 8A:
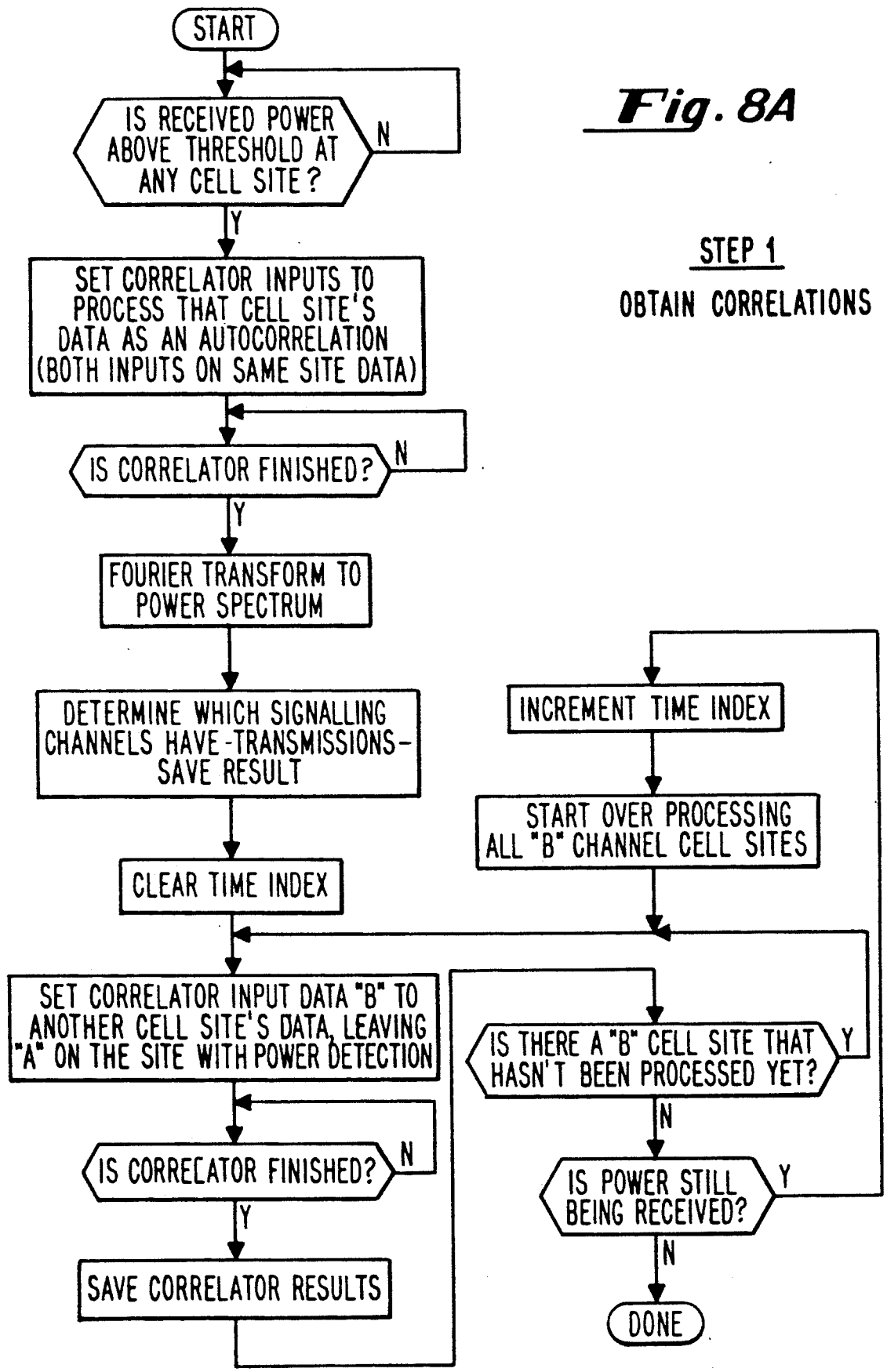
FIGS. 8A–8E are a flowchart of the operation of the cell site system 16 in obtaining correlation data, time delay and frequency difference (TDOA, FDOA) data, and calculating the location of a cellular telephone on the basis of such data.

FIGS. 8A–8E are, collectively, a flowchart of the signal processing employed by the location system to (1) obtain correlation data, (2) obtain time delay and frequency difference data, and (3) calculate location data. Referring now to FIG. 8A, which depicts the processing employed to obtain correlation data, the processing begins by making a determination whether the received power is above a prescribed threshold at any cell site. If so, the complex correlator inputs are set to process that cell site's data as an autocorrelation, i.e., with both inputs set to receive the data from the same cell site. The system then waits until the correlator is finished computing the autocorrelation data. Thereafter, the autocorrelation data is Fourier transformed to obtain power spectrum data. Next, the system determines which signal channels have transmissions and saves the results. Next, a time index is cleared, and then the system sets the correlator input "B" to receive data from another cell site, leaving the "A" input unchanged. The system then waits until the correlator is finished, and then saves the correlation results. Thereafter, the system makes a determination whether there is a "B" cell site that has not been processed yet. If so, the processing branches back as shown to process the data from that cell site. If not, the system determines whether power is still being received; if not, this part of the processing is finished; if so, the time index is incremented and the "B" channel cell site signals are processed again, as shown.

Figure 8B:
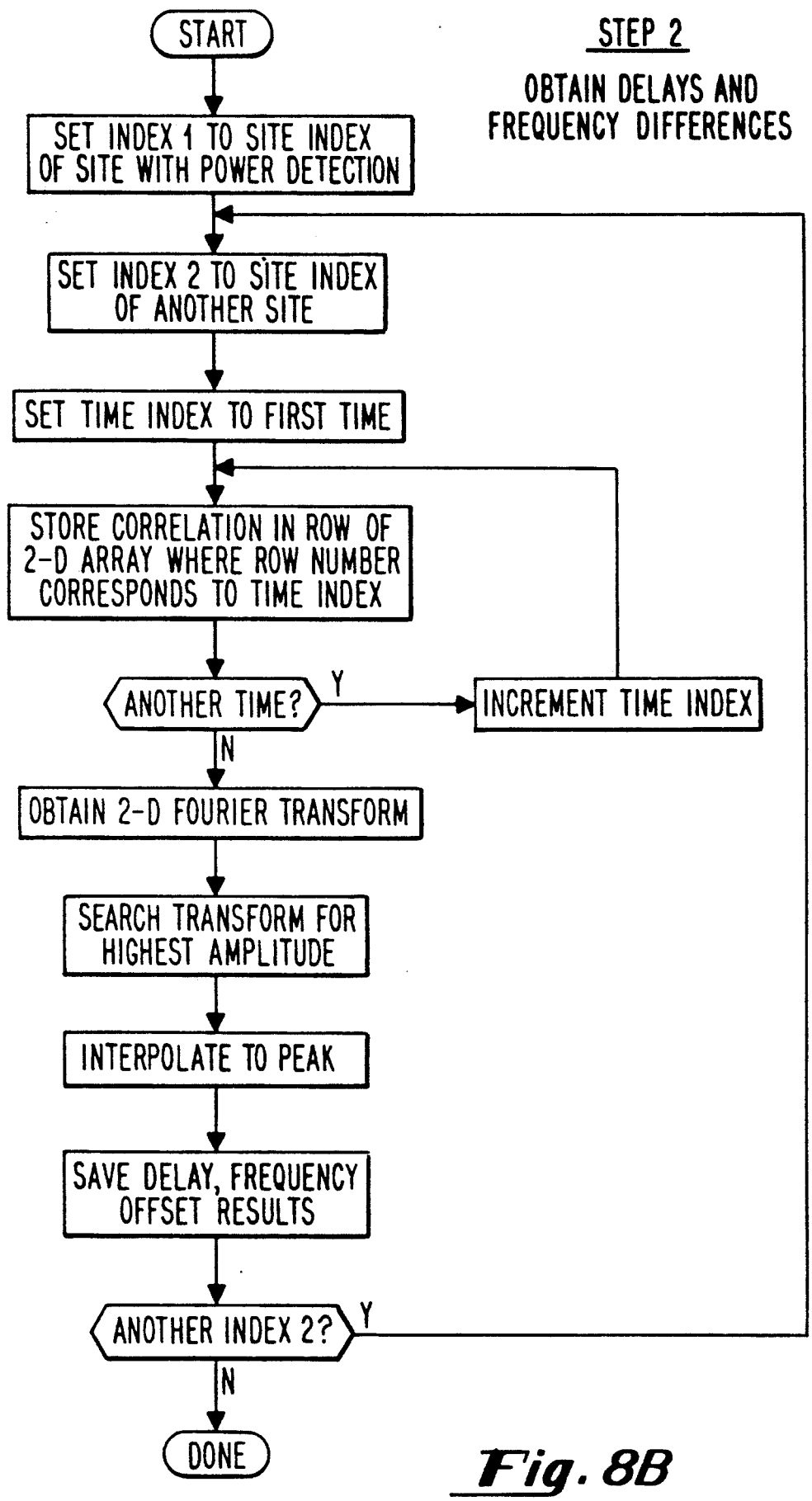

The processing performed to obtain time delay and frequency difference data is depicted in FIG. 8B. The system first sets a first index to a site index for the site at which power was detected. Thereafter, a second index is set to another site. The time index is then set to a first time. The correlation data is then stored in a row of a two dimensional array, where the row number corresponds to the time index. Next, the system determines whether another time sample is to be processed; if so, the time index is incremented and the system branches back as shown. If not, the data in the two-dimensional array is Fourier transformed. The transformed data is then searched for the highest amplitude. An interpolation is then performed to estimate the peak of the transformed data. The time delay and frequency difference results are then saved. The system then determines whether the second index is to be incremented and, if so, branches back as shown.

Figure 8C:
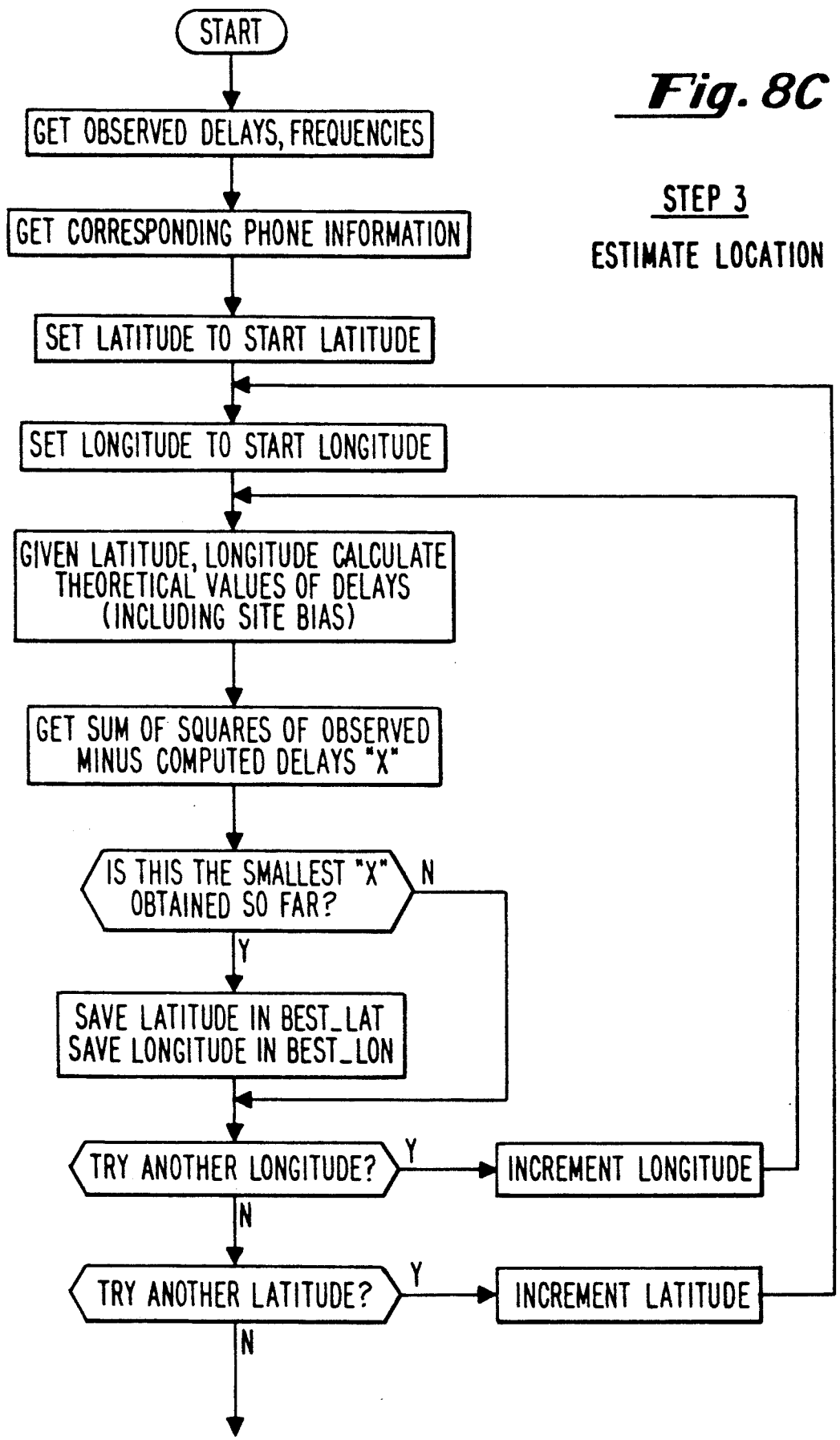
Figure 8D:
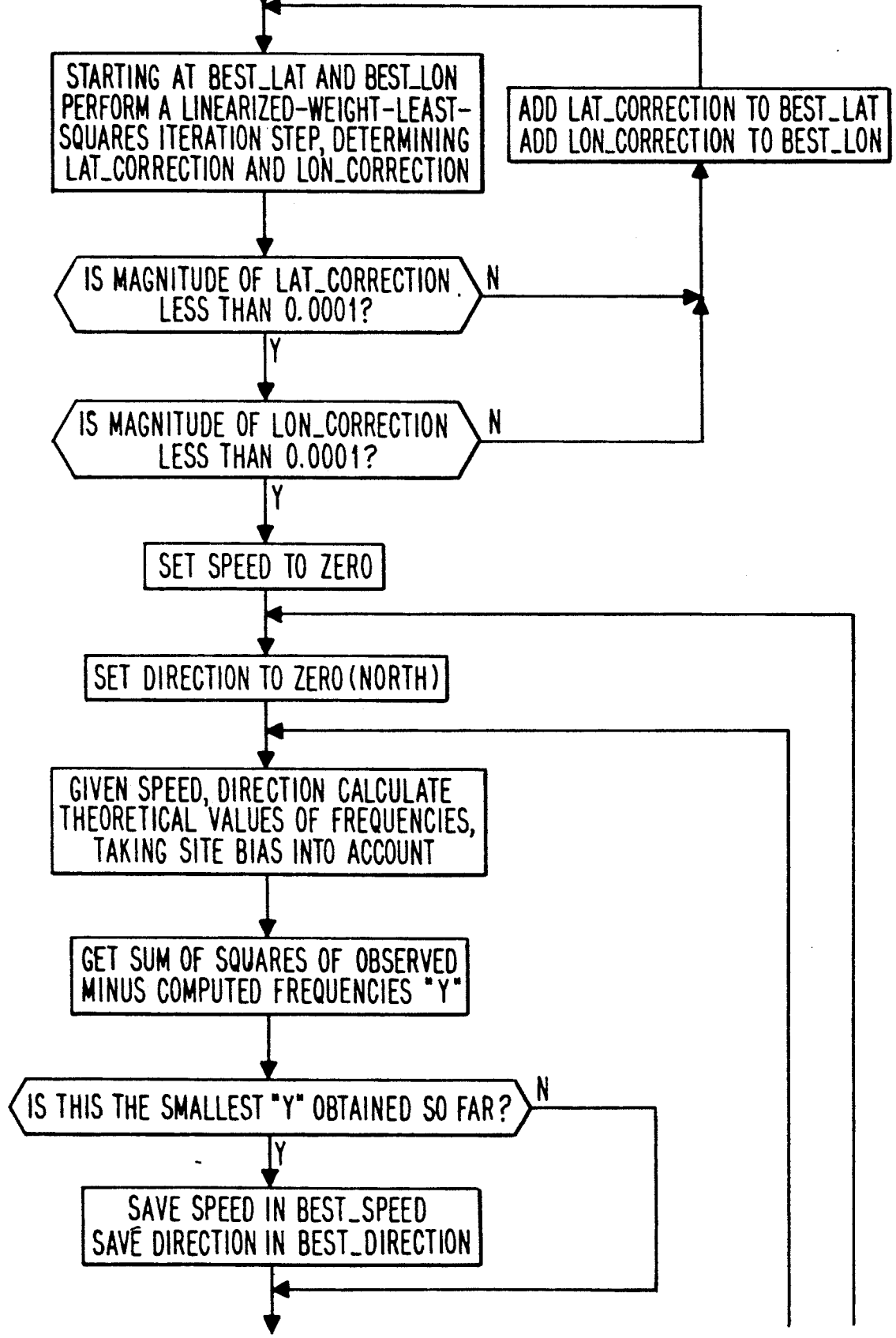
Figure 8E:
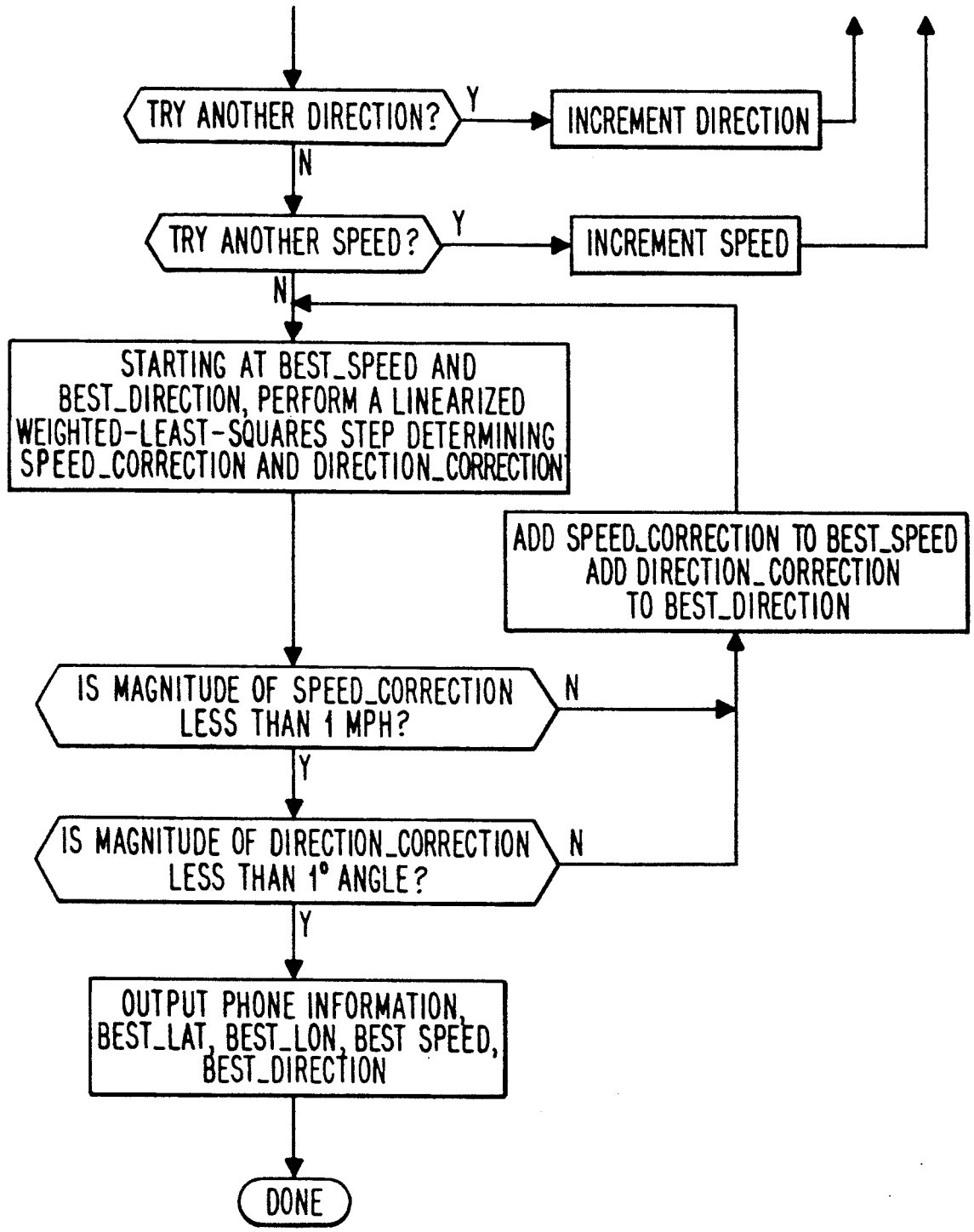

FIGS. 8C–8E depict the location estimation process. Referring to FIG. 8C, the system first retrieves the observed delays and frequencies. The corresponding telephone information is then retrieved. Thereafter, the latitude and longitude are set to starting latitude, longitude values. Given the starting values, the system then calculates theoretical values of delays, taking account of site biases, if any. The system then obtains the sum of squares of the observed delays minus the computed delays. This is denoted "X". The system then determines whether this is the smallest "X" obtained thus far. If not, the system branches forward as shown to increment the starting longitude value. If this is the smallest "X", the latitude is saved in "BEST_LAT" and the longitude is saved in "BEST_LON". The system then determines whether another longitude and latitude should be tested. If not, the system performs a linearized-weighted-least-squares iteration step, starting at BEST_LAT and BEST_LON, to determine correction values "LAT_CORRECTION" and "LON_CORRECTION".

Referring now to FIG. 8D, the location determination process is continued by determining whether the magnitude of LAT_CORRECTION is less than 0.0001 degrees. Similarly, the system determines whether LON_CORRECTION is less than 0.0001 degree. If either of these tests yields a negative result, the value of LAT_CORRECTION is added to BEST_LAT and the value of LON CORRECTION is added to BEST_LON, and the processing branches back to perform another linearized-weighted-least-squares iteration step (FIG. 8C). Once the magnitudes of LAT_CORRECTION and LON_CORRECTION are less than 0.0001, the system proceeds with the velocity calculation by setting a speed variable to zero and a direction variable to zero (i.e., North). Given these starting values of speed and direction, the system calculates theoretical values of frequencies, taking account of any site bias. The system then computes the sum of the squares of observed frequencies minus computed frequencies. This sum is denoted "Y". The system then determines whether this value of "Y" is the smallest obtained thus far. If so, the speed is saved in "BEST_SPEED" and the direction is saved in "BEST_DIRECTION". The system then determines whether another direction should be tested. If so, the direction is incremented and the processing branches back as shown. Similarly, the system determines Whether another speed should be tried and, if so, increments the speed and branches back as shown. If the system decides not to try another direction or speed, it performs a linearized-weighted-least-squares calculation, starting at BEST_SPEED and BEST_DIRECTION, to determine correction values "SPEED_CORRECTION" and "DIRECTION_CORRECTION". Thereafter, the system determines whether the magnitude of SPEED_CORRECTION is less than a specified value, e.g., one mile per hour. If so, the system determines whether the magnitude of DIRECTION_CORRECTION is less than 1°. If either of these tests results in an affirmative answer, the system adds SPEED_CORRECTION to BEST_SPEED and adds DIRECTION_CORRECTION to BEST_DIRECTION, and the processing branches back as shown to perform another linearized-weighted-least-squares calculation. If SPEED_CORRECTION is less than 1 mile per hour and DIRECTION_CORRECTION is less than 1°, the system outputs the telephone information, BEST_LAT, BEST_LON, BEST_SPEED, and BEST_DIRECTION.

Applications

Figure 9:
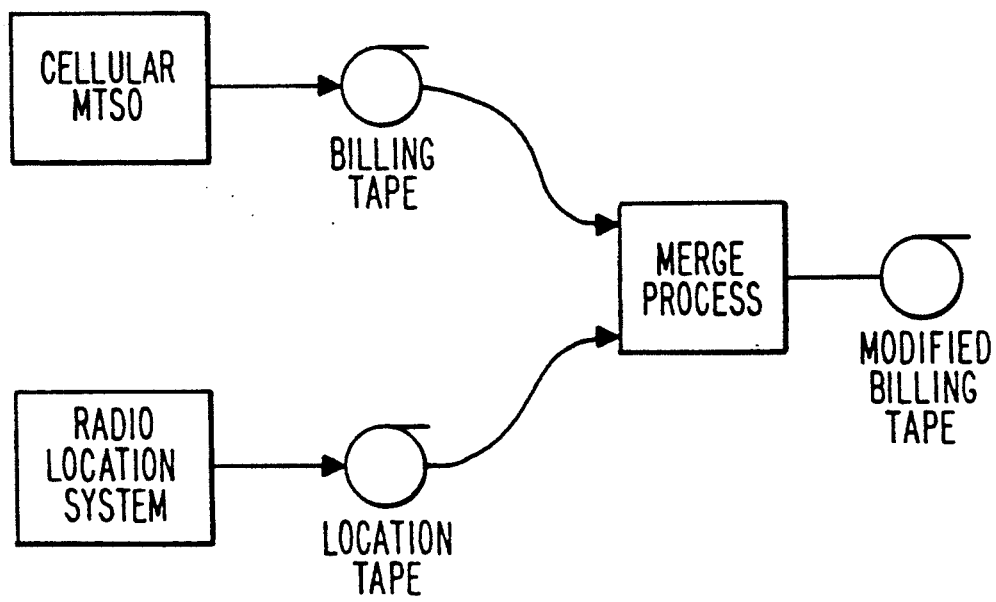
FIG. 9 is a schematic diagram of a process for generating a modified billing tape in accordance with the present invention.

There are a variety of commercially valuable applications of the inventive technology disclosed herein. For example, in addition to the basic function of tracking the location of a mobile cellular telephone, the present invention may be employed to offer subscribers billing rates that vary on the basis of the location from which a call was made. As depicted in FIG. 9, a location tape, containing a record over time of the locations of the subscribers' cellular telephones, may be merged with a billing tape to produce a modified billing tape. The billing tape contains data indicating the cost for each telephone call made by the cellular telephones within a certain time period. This cost is based upon one or more predetermined billing rates. The modified billing data is based upon a different rate for calls made from certain specified locations. For example, the system may apply a lower billing rate for telephone calls made from a user's home or office.

The invention may also be employed to provide emergency assistance, for example, in response to a "911" call. In this application, the location system includes means for automatically sending location information to a specified receiving station in response to receiving a "911" signal from a cellular telephone.

Further, the invention may be employed in connection with an alarm service. In this application, a means is provided for comparing the current location of a given telephone with a specified range of locations and indicating an alarm condition when the current location is not within the prescribed range.

Yet another application involves detecting a lack of signal transmissions by a given telephone and in response thereto automatically paging the telephone to cause it to initiate a signal transmission. This allows the system to locate a telephone that has failed to register itself with the cellular system. Such a feature could be used, for example, to generate an alarm for subscribers at remote locations.

Still another application involves estimating a time of arrival of a given telephone at a specified location. This application is useful, for example, in connection with a public transportation system to provide estimated times of arrival of busses along established routes. Many other applications of this feature are also possible.

Conclusion

Finally, the true scope the present invention is not limited to the presently preferred embodiments disclosed herein. For example, it is not necessary that all or even any of the "cell site systems" be collocated with actual cell sites of an associated cellular telephone system. Moreover, communication links other than T1 links may be employed to couple the cell site systems to the central site system. In addition, the timing signal receiver need not be a GPS receiver, as other means for providing a common timing signal to all cell site systems will be apparent to those skilled in the art. Furthermore, the present invention may be employed in connection with many applications not specifically mentioned above. These include stolen vehicle recovery, fleet management, cell system diagnostics, and highway management. Accordingly, except as they may be expressly so limited, the scope of protection of the following claims is not intended to be limited to the particularities described above.

We claim:

1. A cellular telephone location system for determining the locations of multiple mobile cellular telephones each initiating periodic signal transmission over one of a prescribed set of reverse control channels, comprising:
   (a) at least three cell site systems, each cell site system comprising: an elevated ground-based antenna; a baseband convertor operatively coupled to said antenna for receiving cellular telephone signals transmitted over a reverse control channel by said cellular telephones and providing baseband signals derived from the cellular telephone signals; a timing signal receiver for receiving a timing signal common to all cell sites; and a sampling subsystem operatively coupled to said timing signal receiver and said baseband convertor for sampling said baseband signal at a prescribed sampling frequency and formatting the sample signal into frames of digital data, each frame comprising a prescribed number of data bits and time stamp bits, said time stamp bits representing the time at which said cellular telephone signals were received; and
   (b) a central site system operatively coupled to said cell site systems, comprising: means for processing said frames of data from said cell site systems to generate a table identifying individual cellular telephone signals and the differences in times of arrival of said cellular telephone signals among said cell site systems; and means for determining, on the basis of said times of arrival differences, the locations of the cellular telephones responsible for said cellular telephone signals.

2. A cellular telephone location system as recited in claim 1, wherein said timing signal receiver comprises a global positioning system (GPS) receiver.

3. A cellular telephone location system as recited in claim 1, wherein said central site system comprises a correlator for cross-correlating the data bits of a frame from one cell site system with corresponding data bits from each other cell site system.

4. A cellular telephone location system as recited in claim 3, wherein said central site system further comprises:
   a plurality of data inputs ports each connected to receive a signal from one of said cell site systems;
   interface/deformatting circuits for receiving the signals from said input ports and outputting data bits and a clock signal;
   a plurality of FIFO registers each coupled to an interface/deformatting circuit to receive the data bits and clock signal from that circuit;
   a switch comprising a plurality of input ports, each input port coupled to an output of one of said FIFO registers, and a first output port (A) and a second output port (B), said first output port coupled to an input port of said correlator;
   a computer operatively coupled to said switch to select two of the inputs to said switch to be output on the output ports of said switch;
   a RAM control circuit coupled to said computer and said FIFO registers;
   a sample read clock controlled by said computer and said RAM control to read sample bits from previously selected FIFO registers; and
   a quadrature channel generator comprising an input port coupled to said second output port of said switch and a first output port (B1) and a second output port (B2), and means for outputting an in-phase signal on said first output port (B1) and a quadrature signal on said second output port (B2); wherein said correlator calculates a first correlation coefficient for said DATA A and DATA B1 signals, and a second correlation coefficient for said DATA A and DATA B2 signals.

5. A cellular telephone location system as recited in claim 1, wherein said baseband convertors each comprise: a first mixer providing an intermediate frequency (IF) signal; a synthesizer providing a local oscillator (LO) signal; a single sideband mixer operatively coupled to said first mixer and said synthesizer for converting said IF signal to an upper sideband signal and a lower sideband signal; and means for filtering said upper sideband and lower sideband signals and providing said baseband signals on the basis of the filtered upper and lower sideband signals.

6. A cellular telephone location system as recited in claim 1, comprising:
   first receiver means at a first cell site for receiving a cellular telephone signal;
   demodulator means at said first cell site for demodulating the received cellular telephone signal at said first cell site to produce a demodulated digital bit stream;
   first modulator means at said first cell site for modulating the demodulated digital bit stream to reconstruct the cellular telephone signal as it was originally transmitted, whereby a first reconstructed cellular telephone signal is produced;
   first cross-correlator means at said first cell site for cross-correlating said reconstructed signal against the cellular telephone signal received at said first cell site to produce a first peak indicative of a time of arrival of the cellular telephone signal at the first cell site;
   means for determining the time of arrival of the cellular telephone signal at the first cell site on the basis of said first peak and producing first time of arrival data indicative thereof;
   means for sending the demodulated digital bit stream and first time of arrival data from the first cell site to the central site;
   means for distributing the demodulated digital bit stream and first time of arrival data to a second cell site;
   second modulator means at said second cell site for modulating the demodulated digital bit stream at the second cell site to reconstruct the cellular telephone signal as it was first transmitted by the cellular telephone, whereby a second reconstructed cellular telephone signal is produced;
   second receiver means at said second cell site for receiving said cellular telephone signal;
   second cross-correlator means at said second cell site for cross-correlating the second reconstructed signal against the cellular telephone signal received at the second cell site to produce a second peak indicative of a time of arrival of the cellular telephone signal at the second cell site;
   means for determining the time of arrival of the cellular telephone signal at the second cell site on the basis of said second peak and producing second time of arrival data indicative thereof;
   means for sending said second time of arrival data from the second cell site to the central site; and
   means at said central site for determining time difference of arrival data on the basis of said first and second time of arrival data.

7. A cellular telephone location system as recited in claim 1, comprising location estimation means for:
   (1) creating a grid of theoretical points covering a prescribed geographic area, said theoretical points being spaced at prescribed increments of latitude and longitude;
   (2) calculating theoretical values of time delay for a plurality of pairs of cell sites;
   (3) calculating a least squares difference (LSD) value based on the theoretical time delays and measured time delays for a plurality of pairs of cell sites;
   (4) searching the entire grid of theoretical points and determining the best theoretical latitude and longitude for which the value of LSD is minimized; and
   (5) starting at the best theoretical latitude and longitude, performing another linearized-weighted-least-squares iteration to resolve the actual latitude and longitude to within a prescribed number of degrees or fraction of a degree.

8. A cellular telephone location system as recited in claim 7, wherein said calculating step (2) comprises accounting for any known site biases caused by mechanical, electrical, or environmental factors, said site biases determined by periodically calculating the positions of reference cellular transmitters at known locations.

9. A cellular telephone location system as recited in claim 7, wherein said least squares difference is given by:

$$LSD = [Q_{12}(Delay\_T_{12} - Delay\_O_{12})^2 + Q_{13}(Delay\_T_{13} - Delay\_O_{13})^2 + ... Q_{xy}(Delay\_T_{xy} - Delay\_O_{xy})^2]$$

where, $Delay\_T_{xy}$ represents the theoretical delay between cell sites x and y, x and y being indices representative of cell sites; $Delay\_O_{xy}$ represents the observed delay between cell sites x and y; $Q_{xy}$ is the quality factor the delay measurement cell sites x and y, said quality factor being an estimated measure of the degree to which multipath or other anomalies may have affected a particular delay measurement.

10. A cellular telephone location system as recited in claim 7, further comprising means for detecting a first leading edge of a cellular telephone signal and rejecting subsequent leading edges of said cellular telephone signal, whereby the effects of multipath may be reduced.

11. A cellular telephone location system as recited in claim 1, comprising velocity estimation means for:
   (1) creating a grid of theoretical points covering a prescribed range of velocities, said theoretical points being spaced at prescribed increments;
   (2) calculating theoretical values of frequency difference for a plurality of pairs of cell sites;
   (3) calculating a least squares difference (LSD) value based on the theoretical frequency differences and measured frequency differences for a plurality of pairs of cell sites;
   (4) searching the entire grid of theoretical points and determining the best theoretical velocity for which the value of LSD is minimized; and
   (5) starting at the best theoretical velocity, performing another linearized-weighted-least-squares iteration to resolve the actual velocity to within a prescribed tolerance.

12. A cellular telephone location system as recited in claim 1, further comprising a database for storing location data identifying the cellular telephones and their respective locations, and means for providing access to said database to subscribers at remote locations.

13. A cellular telephone location system as recited in claim 12, further comprising means for providing location data to a specific one of said cellular telephones upon request by the specific telephone.

14. A cellular telephone location system as recited in claim 12, further comprising means for merging said location data with billing data for said cellular telephones and generating modified billing data, wherein said billing data indicates the cost for each telephone call made by said cellular telephones within a certain time period, said cost being based upon one or more predetermined billing rates, and said modified billing data is based upon a different rate for calls made from one or more prescribed locations.

15. A cellular telephone location system as recited in claim 14, wherein the system applies a lower billing rate for telephone calls made from a user's home.

16. A cellular telephone location system as recited in claim 1, further comprising means for transmitting a signal to a selected cellular telephone to cause said selected telephone to transmit a signal over a control channel.

17. A cellular telephone location system as recited in claim 1, further comprising means for automatically sending location information to a prescribed receiving station in response to receiving a distress signal from a cellular telephone, whereby emergency assistance may be provided to a user in distress.

18. A cellular telephone location system as recited in claim 1, further comprising means for comparing the current location of a given telephone with a prescribed range of locations and indicating an alarm condition when said current location is not within said prescribed range.

19. A cellular telephone location system as recited in claim 1, further comprising means for detecting a lack of signal transmissions by a given telephone and in response thereto automatically paging said given telephone to cause said given telephone to initiate a signal transmission and means for indicating an alarm condition.

20. A cellular telephone location system as recited in claim 1, further comprising means for estimating a time of arrival of a given telephone at a prespecified location.

21. A cellular telephone location system as recited in claim 1, further comprising means for continuously tracking a given telephone by receiving voice signals transmitted by said given telephone over a voice channel and determining the location of said given telephone on the basis of said voice signals.

22. A ground-based cellular telephone system serving a plurality of subscribers possessing mobile cellular telephones, comprising:
(a) at least three cell sites equipped to receive signals sent by multiple mobile cellular telephones each initiating periodic signal transmissions over one of a prescribed set of reverse control channels;
(b) locating means for automatically determining the locations of said cellular telephones by receiving and processing signals emitted during said periodic reverse control channel transmissions; and
(c) database means for storing location data identifying the cellular telephones and their respective locations, and for providing access to said database to subscribers at remote locations.

23. A ground-based cellular telephone system as recited in claim 22, further comprising means for providing location data to a specific one of said cellular telephones upon request by the specific telephone.

24. A ground-based cellular telephone system as recited in claim 22, further comprising means for merging said location data with billing data for said cellular telephones and generating modified billing data, wherein said billing data indicates the cost for each telephone call made by said cellular telephones within a certain time period, said cost being based upon one or more predetermined billing rates, and said modified billing data is based upon a different rate for calls made from one or more prescribed locations.

25. A ground-based cellular telephone system as recited in claim 22, further comprising means for transmitting a signal to a selected cellular telephone to cause said selected telephone to transmit a signal over a control channel.

26. A ground-based cellular telephone system as recited in claim 22, further comprising means for automatically sending location information to a prescribed receiving station in response to receiving a distress signal from a cellular telephone, whereby emergency assistance may be provided to a subscriber in distress.

27. A ground-based cellular telephone system as recited in claim 22, further comprising means for comparing the current location of a given telephone with a prescribed range of locations and indicating an alarm condition when said current location is not within said prescribed range.

28. A ground-based cellular telephone system as recited in claim 22, further comprising means for detecting a lack of signal transmissions by a given telephone and in response thereto automatically paging said given telephone to cause said given telephone to initiate a signal transmission.

29. A ground-based cellular telephone system as recited in claim 22, further comprising means for estimating a time of arrival of a given telephone at a prespecified location.

30. A ground-based cellular telephone system as recited in claim 22, further comprising means for continuously tracking a given telephone by receiving voice signals transmitted by said given telephone over a voice channel and determining the location of said given telephone on the basis of said voice signals.

31. A method for determining the location(s) of one or more mobile cellular telephones periodically transmitting signals over one of a prescribed set of reverse control channels, comprising the steps of:
(a) receiving said reverse control channel signals at at least three geographically-separated cell sites;
(b) processing said signals at each cell site to produce frames of data, each frame comprising a prescribed number of data bits and time stamp bits, said time stamp bits representing the time at which said frames were produced at each cell site;
(c) processing said frames of data to identify individual cellular telephone signals and the differences in times of arrival of said cellular telephone signals among said cell sites; and
(d) determining, on the basis of said times of arrival differences, the locations of the cellular telephones responsible for said cellular telephone signals.

32. A method as recited in claim 31, further comprising the steps of storing, in a database, location data identifying the cellular telephones and their respective locations, and providing access to said database to subscribers at remote locations.

33. A method as recited in claim 31, further comprising merging said location data with billing data for said cellular telephones and generating modified billing data, wherein said billing data indicates the cost for each telephone call made by said cellular telephones within a certain time period, said cost being based upon one or more predetermined billing rates, and said modified billing data is based upon a different rate for calls made from one or more prescribed locations.

34. A method as recited in claim 31, further comprising transmitting a signal to a selected cellular telephone to cause said selected telephone to transmit a signal over a control channel.

35. A method as recited in claim 31, further comprising automatically sending location information to a prescribed receiving station in response to receiving a distress signal from a cellular telephone, whereby emergency assistance may be provided to a subscriber in distress.

36. A method as recited in claim 31, further comprising comparing the current location of a given telephone with a prescribed range of locations and indicating an alarm condition when said current location is not within said prescribed range.

37. A method as recited in claim 31, further comprising detecting a lack of signal transmissions by a given telephone and in response thereto automatically paging said given telephone to cause said given telephone to initiate a signal transmission.

38. A method as recited in claim 31, further comprising estimating a time of arrival of a given telephone at a prespecified location.

39. A method as recited in claim 31, further comprising continuously tracking a given telephone by receiving voice signals transmitted by said given telephone over a voice channel and determining the location of said given telephone on the basis of said voice signals.

40. A method as recited in claim 31, comprising the steps of:
   receiving a cellular telephone signal at a first cell site;
   demodulating the received cellular telephone signal at said first cell site to produce a demodulated digital bit stream;
   modulating the demodulated digital bit stream to reconstruct the cellular telephone signal as it was originally transmitted, thereby producing a first reconstructed cellular telephone signal;
   cross-correlating said reconstructed signal against the cellular telephone signal received at said first cell site to produce a first peak indicative of a time of arrival of the cellular telephone signal at the first cell site;
   determining the time of arrival of the cellular telephone signal at the first cell site on the basis of said first peak and producing first time of arrival data indicative thereof;
   sending the demodulated digital bit stream and first time of arrival data from the first cell site to a central site;
   distributing the demodulated digital bit stream and first time of arrival data to a second cell site;
   modulating the demodulated digital bit stream at the second cell site to reconstruct the cellular telephone signal as it was first transmitted by the cellular telephone, thereby producing a second reconstructed cellular telephone signal;
   receiving said cellular telephone signal at said second cell site;
   cross-correlating the second reconstructed signal against the cellular telephone signal received at the second cell site to produce a second peak indicative of a time of arrival of the cellular telephone signal at the second cell site;
   determining the time of arrival of the cellular telephone signal at the second cell site on the basis of said second peak and producing second time of arrival data indicative thereof;
   sending said second time of arrival data from the second cell site to the central site; and
   determining time difference of arrival data on the basis of said first and second time of arrival data.

41. A method as recited in claim 31, comprising estimating the location of a cellular telephone by performing the following steps:
   (1) creating a grid of theoretical points covering a prescribed geographic area, said theoretical points being spaced at prescribed increments of latitude and longitude;
   (2) calculating theoretical values of time delay for a plurality of pairs of cell sites;
   (3) calculating a least squares difference (LSD) value based on the theoretical time delays and measured time delays for a plurality of pairs of cell sites;
   (4) searching the entire grid of theoretical points and determining the best theoretical latitude and longitude for which the value of LSD is minimized; and
   (5) starting at the best theoretical latitude and longitude, performing another linearized-weighted-least-squares iteration to resolve the actual latitude and longitude to within a prescribed number of degrees or fraction of a degree.

42. A method as recited in claim 41, wherein said calculating step (2) comprises accounting for any known site biases caused by mechanical, electrical, or environmental factors, said site biases determined by periodically calculating the positions of reference cellular transmitters at known locations.

43. A method as recited in claim 41, wherein said least squares difference is given by:

$$LSD = [Q_{12}(Delay\_T_{12} - Delay\_O_{12})^2 + Q_{13}(Delay\_T_{13} - Delay\_O_{13})^2 + \ldots Q_{xy}(Delay\_T_{xy} - Delay\_O_{xy})^2]$$

where, $Delay\_T_{xy}$ represents the theoretical delay between cell sites x and y, x and y being indices representative of cell sites; $Delay\_O_{xy}$ is the observed delay between cell sites x and y; $Q_{xy}$ is the quality factor the delay measurement cell sites x and y, said quality factor being an estimated measure of the degree to which multipath or other anomalies may have affected a particular delay measurement.

44. A method as recited in claim 40, further comprising detecting a first leading edge of a cellular telephone signal and rejecting subsequent leading edges of said cellular telephone signal.

45. A method as recited in claim 31, comprising estimating the velocity of a cellular telephone by performing the following steps:

(1) creating a grid of theoretical points covering a prescribed range of velocities, said theoretical points being spaced at prescribed increments;
(2) calculating theoretical values of frequency difference for a plurality of pairs of cell sites;
(3) calculating a least squares difference (LSD) value based on the theoretical frequency differences and measured frequency differences for a plurality of pairs of cell sites;
(4) searching the entire grid of theoretical points and determining the best theoretical velocity for which the value of LSD is minimized; and
(5) starting at the best theoretical velocity, performing another linearized-weighted-least-squares iteration to resolve the actual velocity to within a prescribed tolerance.

* * * * *

UNITED STATES PATENT AND TRADEMARK OFFICE
CERTIFICATE OF CORRECTION

PATENT NO. : 5,327,144
DATED : July 5, 1994
INVENTOR(S) : Louis A. Stilp, et. al.

It is certified that error appears in the above-indentified patent and that said Letters Patent is hereby corrected as shown below:

Title page, item [75], Inventor: should read --Louis A. Stilp--.

Signed and Sealed this

Twelfth Day of March, 1996

Attest:

BRUCE LEHMAN

*Attesting Officer*  *Commissioner of Patents and Trademarks*